United States Patent
Al-Anazi et al.

(10) Patent No.: US 11,512,557 B2
(45) Date of Patent: Nov. 29, 2022

(54) INTEGRATED SYSTEM AND METHOD FOR AUTOMATED MONITORING AND CONTROL OF SAND-PRONE WELL

(71) Applicant: Saudi Arabian Oil Company, Dhahran (SA)

(72) Inventors: Ammal Al-Anazi, Ras Tanura (SA); James Arukhe, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 112 days.

(21) Appl. No.: 17/164,516

(22) Filed: Feb. 1, 2021

(65) Prior Publication Data

US 2022/0243562 A1 Aug. 4, 2022

(51) Int. Cl.
*E21B 34/02* (2006.01)
*E21B 47/06* (2012.01)
(Continued)

(52) U.S. Cl.
CPC ............ *E21B 34/025* (2020.05); *E21B 47/06* (2013.01); *G01N 17/006* (2013.01); *G05D 7/06* (2013.01)

(58) Field of Classification Search
CPC ........ E21B 34/02; E21B 34/025; E21B 34/04; E21B 34/045; G01N 17/006; G05D 7/06
See application file for complete search history.

(56) References Cited

U.S. PATENT DOCUMENTS 1,986,600 A * 1/1935 Pigott ...................... E21B 34/02
33/DIG. 2

4,638,833 A * 1/1987 Wolcott, II ............. F16K 47/04
137/551

(Continued)

FOREIGN PATENT DOCUMENTS

EP 2947264 A2 5/2015
GB 2431993 A 5/2007
(Continued)

OTHER PUBLICATIONS

Rabeea et al., "Flow assurance study of gathering pipeline system at a gas condensate field", Jun. 2018, Gas Processing * LNG, 8 pages (Year: 2018).*

(Continued)

*Primary Examiner* — Jennifer H Gay
(74) *Attorney, Agent, or Firm* — Bracewell LLP; Constance G. Rhebergen; Keith R. Derrington

(57) ABSTRACT

Measurement data including data of a sand production rate from a sand metering sensor, pressure data from a pressure sensor, and data of a metal loss value from a metal loss sensor is obtained. A maximum sand erosional velocity ratio and a pressure drawdown are determined. An optimum choke valve setting is determined based on a predefined correlation between the sand production rate, the pressure drawdown, and the maximum sand erosional velocity ratio, in response to determining that the maximum sand erosional velocity ratio is not within a predetermined maximum sand erosional velocity ratio limit. An updated pressure drawdown produced by the determined optimum choke valve setting is within a predetermined pressure drawdown operating window. The surface choke valve is set based on the determined optimum choke valve setting. The well is shutdown by triggering an emergency shutdown device in response to determining that the obtained metal loss value has reached a predefined metal loss limit value.

17 Claims, 11 Drawing Sheets

(51) Int. Cl.
*G01N 17/00* (2006.01)
*G05D 7/06* (2006.01)

(56) References Cited

U.S. PATENT DOCUMENTS

| | | | |
|---|---|---|---|
| 5,250,807 A | 10/1993 | Sontvedt | |
| 6,257,332 B1 | 7/2001 | Vidrine et al. | |
| 6,484,800 B2 | 11/2002 | Camody et al. | |
| 6,837,093 B2 | 1/2005 | Yamasaki et al. | |
| 7,836,973 B2 | 11/2010 | Belcher et al. | |
| 7,878,047 B2* | 2/2011 | Hemblade | G01N 17/04 73/61.75 |
| 7,967,066 B2 | 6/2011 | McStay et al. | |
| 8,561,694 B2* | 10/2013 | Hemblade | E21B 43/04 166/243 |
| 9,057,256 B2 | 6/2015 | Ige et al. | |
| 9,422,793 B2* | 8/2016 | Gomes | E21B 47/01 |
| 10,989,328 B2* | 4/2021 | Giove | F16K 3/246 |
| 11,333,010 B2* | 5/2022 | Ahmari | E21B 34/025 |
| 2008/0028838 A1 | 2/2008 | Morten et al. | |
| 2008/0154510 A1* | 6/2008 | Scott | E21B 43/12 166/250.15 |
| 2008/0282781 A1* | 11/2008 | Hemblade | G01N 17/04 73/61.76 |
| 2010/0326654 A1* | 12/2010 | Hemblade | E21B 43/08 166/250.01 |
| 2012/0118564 A1* | 5/2012 | Gomes | E21B 47/017 166/250.12 |
| 2013/0175030 A1 | 7/2013 | Ige et al. | |
| 2014/0214326 A1 | 7/2014 | Samuel et al. | |
| 2016/0298401 A1* | 10/2016 | Cotten | G05B 19/05 |
| 2016/0312552 A1 | 10/2016 | Early et al. | |
| 2018/0051549 A1* | 2/2018 | Holyfield | E21B 47/001 |
| 2019/0033898 A1* | 1/2019 | Shah | G01N 29/14 |
| 2019/0264832 A1* | 8/2019 | Giove | F16K 3/246 |

FOREIGN PATENT DOCUMENTS

| | | |
|---|---|---|
| WO | 2009026357 A3 | 2/2009 |
| WO | 2013090374 A1 | 6/2013 |
| WO | 2020153864 A1 | 7/2020 |

OTHER PUBLICATIONS

Salama, "An Alternative to API 14E Erosional Velocity Limits for Sand-Laden Fluids", Jun. 2000, Journal of Energy Resources, 7 pages (Year: 2000).*
Sani et al., "Review of the API RP 14E erosional velocity equation: origin, applications, misuses and limitations", 2019, NACE International, Paper No. 13206, 15 pages (Year: 2019).*
Hamza N., et al., "A New Concept of Sand Management Philosophy; Revolutionary & Cost Effective Solution", pp. 1-10, dated Oct. 17, 2017, XP055915153.
International Search Report and Written Opinion for PCT Application No. PCT/US2022/014553 dated May 18, 2022.
C. Hank Rawlings, "Sand Management Methodologies for Sustained Facilities Operations", SPE-164645, 2013, 10 pages.
Saether, "Choke Condition and Performance Monitoring", M.Sc. Thesis, NTNU, Jun. 14, 2020, 105 pages.
Strong et al., "An Integrated System for Pipeline Condition Monitoring", IPTC-13661, 2009, 13 pages.
Wellhead Sand Monitoring, "Production Wellhead Sand Detection and Control", www.Emerson.com, 2018, 2 pages.

* cited by examiner

INTEGRATED SYSTEM AND METHOD FOR AUTOMATED MONITORING AND CONTROL OF SAND-PRONE WELL

TECHNICAL FIELD

Embodiments relate generally to integrated monitoring and control operations on a hydrocarbon producing well by automatically adjusting a choke at a surface of the well based on a sand production rate of the well and by automatically shutting down the well completely based on metal thickness loss measurements across production and processing equipment of the well.

BACKGROUND

Hydrocarbon fluids such as oil and natural gas are obtained from a subsurface geological formation, referred to as a reservoir, by drilling a well that penetrates the underground hydrocarbon-bearing formation. Once a wellbore has been drilled, the well must be "completed". Completion is a process in which the well is enabled to produce hydrocarbons. A completion involves design, selection and installation of equipment and materials in or around the wellbore for conveying, pumping, or controlling production or injection of fluids. After the well has been completed, production of oil and gas can begin.

Oil and gas wells completed in sandstone reservoirs that are subject to uncontrolled production may trigger uncontrolled sand production at rates that can impair integrity of components like downhole tubulars, surface choke valves, joints, and flow lines of the well. Uncontrolled sand production may lead to surface and subsurface erosion, which poses threat to safety, meeting rate commitments, equipment integrity, and the environment. As a result, it is important to control the rate of flow of fluids (e.g., production rate) and rate of sand (e.g., sand production rate) from a wellhead of a completed well to ensure optimal production without causing damage to the well, equipment, or to the surrounding environment, and while also maintaining production rate commitments.

A pressure differential between the producing formation and the wellbore causes hydrocarbon fluids to flow into the wellbore. The higher the pressure differential, the higher the rate at which the hydrocarbon fluid from the producing formation can flow into the wellbore. The higher-pressure differential may also cause solid particles such as sand or slit from the formation to mix and flow with the hydrocarbon fluid into the wellbore at higher rates. Thus, if fluid flow through the well is allowed at too great a flow rate, the sand production rate (e.g., sand rate in parts per million (PPM)) may also increase proportionally and the sand or slit from the producing formation at high sand rates (e.g., high PPM values) can damage (erode) components of the pipeline it comes in contact with. To slow the rate of sand entrained in liquid production and flowing into the wellbore, the pressure differential can be lowered by slightly closing a choke mounted on the wellhead to incrementally increase the resistance to flow through the choke. Consequently, the pressure in the wellbore will slightly increase, thereby reducing the pressure differential between the producing formation and the wellbore and the likely rate of sand incursion.

Excess sand production is undesirable for a number of reasons. First, the sand can damage or destroy equipment or piping by abrading surfaces contacted by the flowing sand. The sand production induced degraded equipment may cause undesirable incidents, e.g., oil spills and gas leaks that adversely affect safety, production (e.g., missed rate commitments), equipment integrity, and the environment. Further, high sand production can significantly increase operational and maintenance expenses and can lead to a total loss of the well requiring costly repair and lost production. Conventionally, monitoring and control operations on such sand-prone wells is done through physical checks by operators or through conventional controlling and monitoring systems that simply notify the operator of measured sensor data. Actions taken by the operators of such conventional systems based on the notified sensor data are typically reactive, and such actions are taken only after an incident (e.g., leak due to pipe or choke erosion) has already occurred. A better and more proactive automated approach is desirable.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method for monitoring and controlling operations of a well is provided which includes: obtaining measurement data from each of a plurality of sensors, the measurement data including data of a sand production rate from a sand metering sensor, pressure data from at least one pressure sensor, and data of a metal loss value from at least one metal loss sensor; determining a maximum sand erosional velocity ratio and a pressure drawdown based on the obtained measurement data; determining whether the maximum sand erosional velocity ratio is within a predetermined maximum sand erosional velocity ratio limit; determining an optimum choke valve setting based on a predefined correlation between the sand production rate, the pressure drawdown, and the maximum sand erosional velocity ratio, in response to determining that the maximum sand erosional velocity ratio is not within the predetermined maximum sand erosional velocity ratio limit, wherein an updated pressure drawdown produced by the determined optimum choke valve setting is within a predetermined pressure drawdown operating window; setting a surface choke valve based on the determined optimum choke valve setting; detecting an emergency shutdown condition in response to determining that the obtained metal loss value has reached a predefined metal loss limit value; and shutting down the well by triggering an emergency shutdown device (ESD) in response to detecting the emergency shutdown condition.

In another embodiment, a system for monitoring and controlling operations of a well is provided which comprises: a plurality of sensors for obtaining measurement data, the plurality of sensors including a sand metering sensor for obtaining data of a sand production rate, at least one pressure sensor for obtaining pressure data, and at least one metal loss sensor for obtaining data of a metal loss value; a choke valve that is disposed on a production fluid flow path on a surface of the well, and that is adjustable to change a fluid flow; an emergency shutdown device (ESD) that is operable to shutdown the well by closing a surface safety valve; memory storing predetermined data including a predefined correlation between the sand production rate, pressure drawdown, and a maximum sand erosional velocity ratio; and one or more processors operatively coupled to the plurality of sensors, the choke valve, the ESD, and the memory, the one or more processors being configured to: obtain the measurement data from each of the plurality of sensors; determine the maximum sand erosional velocity ratio and the pressure drawdown based on the obtained measurement data; determine whether the maximum sand erosional velocity ratio is within a predetermined maximum sand erosional velocity ratio limit; determine an optimum choke valve setting based on the predefined correlation in response to determining that the maximum sand erosional velocity ratio is not within the predetermined maximum sand erosional velocity ratio limit, wherein an updated pressure drawdown produced by the determined optimum choke valve setting is within a predetermined pressure drawdown operating window; set the choke valve based on the determined optimum choke valve setting; detect an emergency shutdown condition in response to determining that the metal loss value from the at least one metal loss sensor has reached a predefined metal loss limit value; and shut down the well by triggering the ESD in response to detecting the emergency shutdown condition.

In yet another embodiment, the method and system may be embodied in computer executable program code and stored in a non-transitory storage device (computer-readable recording medium).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
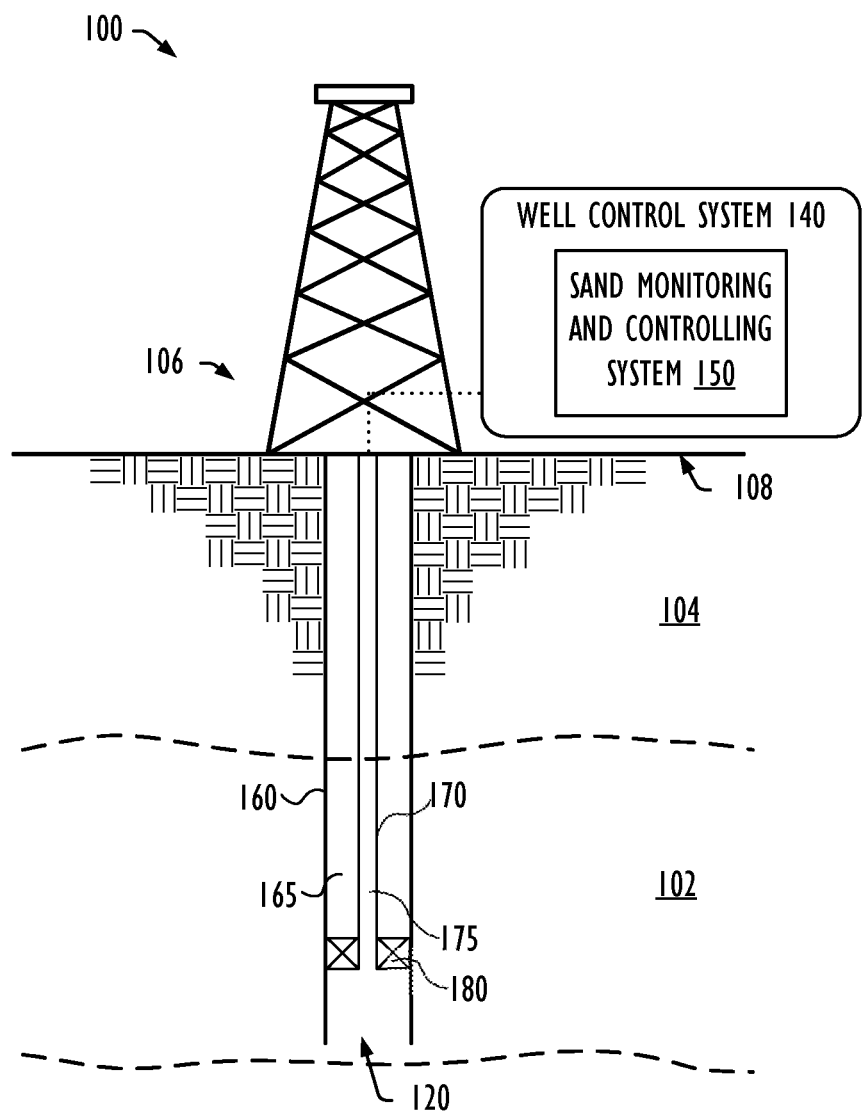
FIG. 1 is a schematic diagram of a well environment in accordance with one or more embodiments.

While certain embodiments will be described in connection with the illustrative embodiments shown herein, the subject matter of the present disclosure is not limited to those embodiments. On the contrary, all alternatives, modifications, and equivalents are included within the spirit and scope of the disclosed subject matter as defined by the claims. In the drawings, which are not to scale, the same reference numerals are used throughout the description and in the drawing figures for components and elements having the same structure.

DETAILED DESCRIPTION

In the following description, for purposes of explanation, numerous specific details are set forth in order to provide a thorough understanding of the inventive concept. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" or "another embodiment" means that a particular feature, structure, or characteristic described in connection with the embodiment is included in at least one embodiment of the disclosed subject matter, and multiple references to "one embodiment" or "an embodiment" or "another embodiment" should not be understood as necessarily all referring to the same embodiment.

This disclosure pertains to an integrated system and method for automated monitoring and control of sand-prone oil and gas wells. The integrated system includes components disposed downhole and, on the surface, and include a control module (e.g., controller implementing control logic) to monitor, control and operate sand-prone oil and gas wells within an allowable integrity envelope (e.g., within maximum sand erosional velocity ratio limit, within pressure drawdown operating window) by optimizing choke valve settings based on sand production rates and monitoring the integrity (e.g., metal loss) of flow path components like the surface choke and downhole tubular during well production. The system prevents uncontrolled downhole tubular and/or choke valve failures, thereby eliminating loss of production, saving operating expenses for repairs/replacements, enhancing safety and protecting oil/gas industry environments. The integrated monitoring and control system includes a downhole sand meter, distributed downhole metal loss sensors along a fluid flow path, a choke valve with an integrated metal loss sensor, a choke valve mover to automatically adjust a choke position of the choke valve, a downhole pressure sensor, a surface pressure sensor, a control module (e.g., controller with algorithm logic; programmable logic controller (PLC); controller logic implemented in hardware, software, or both; and the like), an emergency shutdown device (ESD), a hydraulic surface safety valve (SSV) at the wellhead that is actuated by the ESD, and a supervisory control and data acquisition (SCADA) system.

During operation, the downhole sand meter measures a solid particle count rate (e.g., sand or slit production rate;

sand rate in PPM; and the like) in the fluid flowing in the production tubular, and distributed metal loss sensors (e.g., dispersed across multiple downhole and uphole/surface locations of the fluid flow path) detect metal thickness loss measurements due to sand erosion at speeds approaching real-time. The integrated system collects the sand rate and the metal loss measurements and feeds the collected data to the controller. The controller includes algorithm logic (e.g., implemented in hardware (e.g., programmable logic controller) and/or software (e.g., program instructions and data)) to set the choke valve at an optimum setting or position based on the current sand production rate. In determining the optimum choke valve setting or position, the controller determines the maximum sand erosional velocity ratio based on the obtained measurement data (e.g., sand production rate, pressure drawdown), and determines a choke position based on a predefined correlation between sand production rate, pressure drawdown, and maximum sand erosional velocity ratio such that the maximum sand erosional velocity ratio becomes less than or equal to a predefined maximum sand erosional velocity ratio limit, and the pressure drawdown remains within a predetermined pressure drawdown operating window. Pressure drawdown may be defined as the difference between flowing bottom-hole pressure and flowing wellhead pressure.

Further, a metal thickness loss count across the production tubular and inside the surface choke valve feeds to the controller whose algorithm logic controls to trigger closing of the well immediately from the hydraulic surface safety valve through the ESD, as needed, based on the fed metal thickness loss data reaching a predefined metal loss limit (e.g., threshold limit). In addition, the controller may give indication of life of the surface choke valve base on measured metal loss sensor data relating to cavitation, sand particle shape, sand particle size, sand particle properties, impact angle, velocity, and the general solids abrasion against the choke. Thus, based on the sand rate measurement, the controller sets the choke valve at an optimum position or value to keep maximum erosion rate in check. Further, the controller controls to trigger shutdown of the surface safety valve (SSV) based on the metal loss sensor measurements for erosion values approaching the predefined threshold metal loss limit. The controller further connects to the SCADA system to provide an overview of the entire workflow of the integrated system with the functionality for presenting the measured sensor data (e.g., actual sand rate and metal loss measurements) to the operation/production engineer, and notifying (e.g., sending an alarm) the engineer when the measured sensor data (e.g., actual sand rate and metal loss measurements) is approaching a corresponding threshold limit (e.g., maximum sand erosional velocity ratio limit, maximum erosion rate limit, predefined metal loss limit, and the like).

FIG. 1 is a diagram that illustrates well environment 100 in accordance with one or more embodiments. In the illustrated embodiment, well environment 100 includes reservoir ("reservoir") 102 located in subsurface formation ("formation") 104, and well system ("well") 106. Formation 104 may include a porous or fractured rock formation that resides underground, beneath the Earth's surface ("surface") 108. Reservoir 102 may be a hydrocarbon reservoir, and well 106 may be a hydrocarbon well, such as an oil well. In the case of well 106 being a hydrocarbon well, reservoir 102 may be a hydrocarbon reservoir defined by a portion of formation 104 that contains (or that is determined contain to or expected to contain) a subsurface pool of hydrocarbons, such as oil and gas, that coexist with formation connate water. Formation 104 and reservoir 102 may each include different layers of rock having varying characteristics, such as varying degrees of lithology, permeability, porosity and fluid saturations. In the case of well 106 being operated as a production well, well 106 may facilitate the extraction of hydrocarbons (e.g., "production" of production fluid) from reservoir 102. In the case of well 106 being operated as an injection well, well 106 may facilitate the injection of substances, such as gas or water, into reservoir 102 (e.g., injection of injection fluid). In the case of well 106 being operated as a monitoring well, well 106 may facilitate the monitoring of various characteristics of formation 104 or reservoir 102, such as reservoir saturation or pressure.

Well 106 may include wellbore 120 and well control system 140. Wellbore 120 (or "borehole") may include a bored hole that extends from surface 108 into a target zone of formation 104, such as reservoir 102. An upper end of wellbore 120, at or near surface 108, may be referred to as the "uphole" end of wellbore 120. A lower end of wellbore 120, terminating in formation 104, may be referred to as the "downhole" end of wellbore 120. Wellbore 120 may be created, for example, by a drill bit boring through formation 104 and reservoir 102. Wellbore 120 may provide for circulation of drilling fluids during drilling operations, flow of hydrocarbons (e.g., oil and gas; production fluid) from reservoir 102 to surface 108 during production operations, injection of substances (e.g., water; injection fluid) into formation 104 or reservoir 102 during injection operations, or communication of monitoring devices (e.g., logging tools) into formation 104 or reservoir 102 during monitoring operations. In some embodiments, wellbore 120 includes cased or uncased (or "open-hole") portions. A cased portion may include a portion of wellbore 120 lined with casing (e.g., the uphole end of the wellbore 120 may be lined with casing pipe and cement). An uncased portion may include a portion of the wellbore 120 that is not lined with casing (e.g., the open-hole, downhole end of the wellbore 120).

As shown in FIG. 1, wellbore 120 may be encased by outer casing 160 that separates and isolates wellbore 120 from surrounding formation 104 and reservoir 102 and associated subsurface materials (e.g., water, hydrocarbons, and the like). Although not shown in FIG. 1, within outer casing 160 of wellbore 120, one or more inner casings may be disposed so as to define an annular space between an outer surface of an inner casing and an inner surface of outer casing 160. Further, as shown in FIG. 1, within the innermost casing of wellbore 120 (e.g., casing 160 in FIG. 1), wellbore 120 may include tubular 170, that defines tubular space 175, and that creates annular space 165 (e.g., tubing-casing annulus (TCA), well annulus, and the like) between an outer surface of tubular 170 and an inner surface of casing 160. Although FIG. 1 shows wellbore 120 housing tubular 170 as being encased by outer casing 160, this is not intended to be limiting. Additional or fewer casings and/or tubulars may be included in wellbore 120, resulting in the formation of more or less well annular spaces 165 (e.g., one or more tubing-casing annulus, casing-casing annulus, and the like). When well 106 is operated as a production well, production fluid may flow to the surface through tubular 170. Packer 180 may be disposed in TCA 165 to provide a seal between the outside of production tubing 170 and the inside of outer casing 160. Although FIG. 1 illustrates well 106 as being an onshore well, this may not necessarily be the case. In another embodiment, well 106 may be an offshore well with wellbore 120 penetrating the seabed to reach and extract production fluids from reservoir 102. In case well 106 is an offshore well, at least some of the components of well control system 140 may be provided on an offshore platform associated with and coupled to the wellhead of wellbore 120 or at another remote onshore or offshore location.

As shown in FIG. 1, well 106 further includes well control system 140. Well control system 140 may control various operations of well 106, such as well drilling operations, well completion operations, well production operations, well formation monitoring and control operations, or well maintenance operations. In some embodiments, control logic (algorithm logic) of control system 140 may be implemented on a computer system that is the same as or similar to computer system 1100 described with regard to at least FIG. 11. As shown in FIG. 1, well control system 140 may include sand monitoring and controlling system 150. Sand monitoring and controlling system 150 works to solve a crucial production optimization challenge. Sand monitoring and controlling system 150 controls and monitors a rate of sand production (e.g., sand rate or ratio (in PPM) in liquid production) of well 106 during fluid flow and automatically adjusts a surface choke valve (see FIG. 2) based on the sand production rate, and based on a predefined correlation between the sand production rate, the pressure drawdown, and maximum sand erosional velocity ratio such that the maximum sand erosional velocity ratio value is within a predefined maximum sand erosional velocity ratio limit value (e.g., limit value=1), and the pressure drawdown (and corresponding production rate) remains within a predetermined pressure drawdown operating window. Further, sand monitoring and controlling system 150 performs control operations to shutdown well 106 based on metal thickness loss measurements associated with components like the choke valve and production tubular 170 reaching a predefined metal loss limit. Although not specifically shown in FIG. 1, components of sand monitoring and controlling system 150 may be disposed so as to be distributed across multiple locations (e.g., locations downhole inside wellbore 120, locations remote to well environment 100, uphole/surface locations of well 106, and the like) or provided or otherwise operate outside well control system 140 and be communicatively coupled thereto. For example, sand monitoring and controlling system 150 may include one or more sensors that are disposed downhole along production tubing 170 of wellbore 120.

Figure 2:
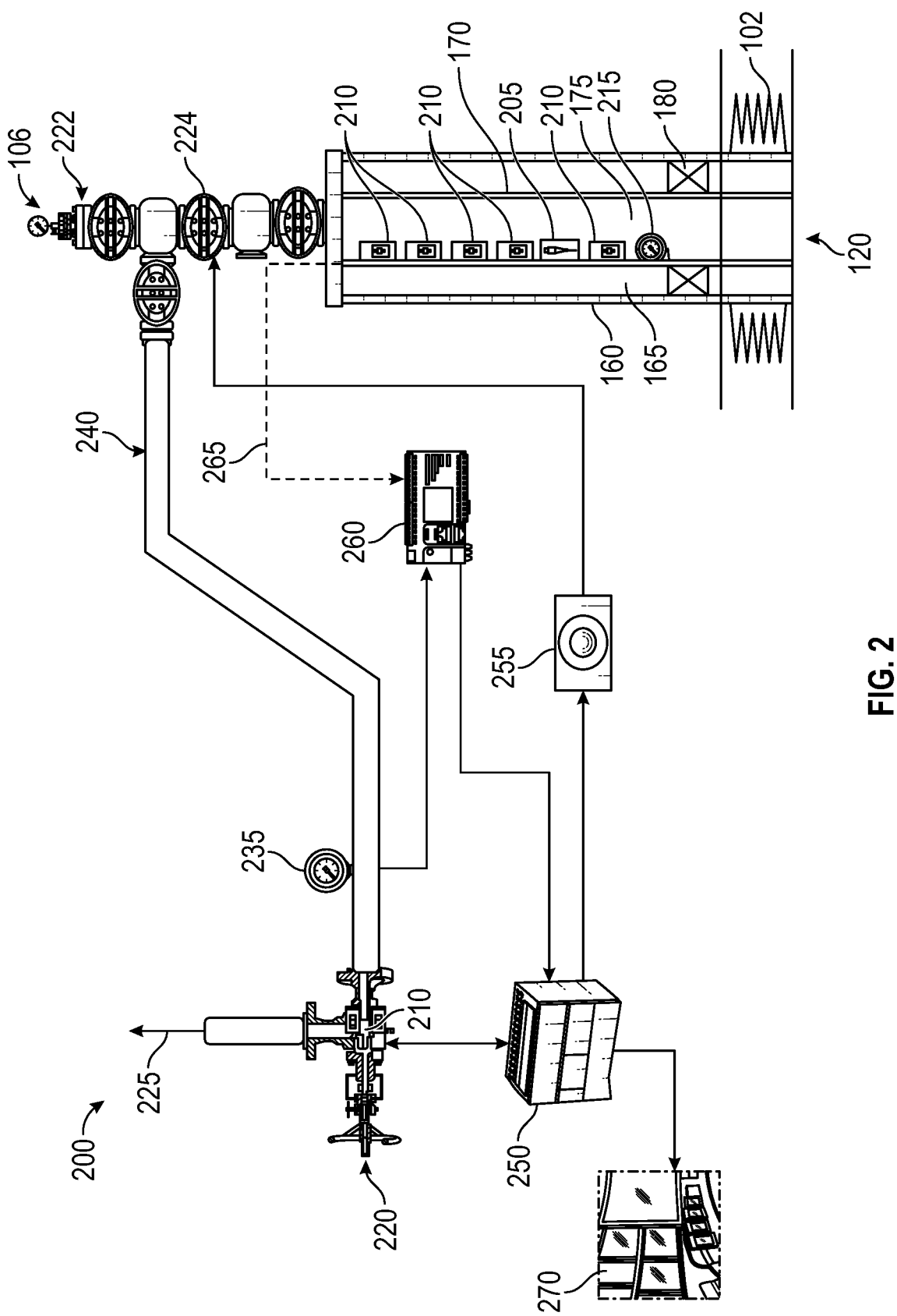
FIG. 2 is a schematic diagram of a well equipped with an integrated sand monitoring and controlling system in accordance with one or more embodiments.

FIG. 2 is a schematic diagram of a well equipped with integrated sand monitoring and controlling system 200 in accordance with one or more embodiments. Elements in FIG. 2 that are generally the same as those in FIG. 1 are denoted by like reference numerals and detailed description thereof will be omitted to avoid duplication. As shown in FIG. 2, sand monitoring and controlling system 200 includes components disposed downhole inside wellbore 120, as well as components disposed on the surface. Although not specifically shown in FIG. 2, components of sand monitoring and controlling system 200 may also be disposed at locations remote to well 106 and communicatively coupled thereto. Sand monitoring and controlling system 200 may include a plurality of sensors (e.g., sensors 205, 210, 215, 235), data acquisition module 260, and controller 250.

The plurality of sensors may include sensors disposed downhole inside wellbore 120, as well as sensors disposed uphole wellbore 120 and adjacent wellhead 222, and/or sensors further downstream from wellhead 222 on the surface and along the fluid flow path defined by surface production and processing equipment of well 106. For example, as shown in FIG. 2, sand monitoring and controlling system 200 may include permanent downhole sensors such as permanent downhole sand meter 205 and downhole pressure sensor 215, and uphole sensors such as pressure sensor 235. Sand monitoring and controlling system 200 may further include a plurality of metal loss sensors 210 (e.g., sensors 210A, 210B, . . . 210N) disposed at downhole and surface/uphole locations along the fluid flow path of wellbore 120. In the example shown in FIG. 2, a plurality of metal loss sensors 210 are disposed in a distributed manner at multiple locations along downhole tubing 170. Metal loss sensors 210 in FIG. 2 further include metal loss sensor 210 that is integrally provided with choke valve 220 disposed on the surface and downstream of wellhead 222. The number and location of metal loss sensors 210 is not intended to be limiting so long as metal loss sensors 210 can provide real-time metal thickness loss measurements due to sand erosion across desired locations or areas of the fluid flow path of well 106. Thus metal loss sensors 210 can be disposed at predetermined regular or irregular intervals along one or more components of the fluid flow path of well 106 including along production tubing 170, at wellhead 222, inside surface safety valve 224, along flowline 240, inside choke valve 220, along components or flowlines downstream from choke valve 220, at one or more joints along the fluid flow path, and the like.

Each metal loss sensor 210 (e.g., sensors 210A, 210B, . . . , 210N) is configured to detect metal thickness loss (e.g., metal loss count, metal loss measurement, and the like) due to sand erosion arising from the sand-laden fluid flow at speeds approaching real-time. For example, metal loss sensors 210 along production tubing 170, and metal loss sensor 210 inside surface choke valve 220 provide corresponding meal thickness loss measurements (e.g., metal loss count or value) by logging (e.g., periodically at predetermined intervals, or at irregular intervals based on occurrence of predetermined conditions or based on user operation) a corresponding electrical resistance value, thereby monitoring and providing a corresponding metal loss measurement or count value in real-time for a corresponding region or area of the fluid flow path (e.g., corresponding region of production tubing 170, flowline 240, choke valve 220, surface safety valve 224, and the like where the particular metal loss sensor is disposed). Each metal loss sensor 210 may further be configured to transmit its identification information along with the measurement data. The identification information may help ascertain the specific location of the particular sensor 210 along the flow path and the component whose metal loss data the sensor 210 is positioned to measure. As will be explained in more detail later, the metal loss count across production tubular 170 and inside surface choke 220 from sensors 210 feeds to controller 250 to trigger emergency shutdown device (ESD) 255 for closing well 106 immediately from hydraulic SSV 224, as needed, based on a predefined metal loss limit being reached for one or more of the metal loss sensors 210. Any suitable technique or combination of techniques (e.g., electrical resistance sensor, electrochemical sensor, ultrasonic testing sensor, magnetic flux leakage sensor, electromagnetic sensor, optical fiber sensor, and the like) may be employed to implement each metal loss sensor 210, so long as respective metal loss measurements representing metal thickness loss arising from erosion can be detected for downhole and uphole sections of the fluid flow (e.g., production flow) path at substantially real-time speeds.

Sand meter 205 may include one or more permanent downhole sand metering sensors or probes installed in the fluid flow path of well 106 to assist with measuring solid particle (e.g., sand, slit) count rate (e.g., sand production rate measured in PPM in liquid production) in the fluid flow of well 106. FIG. 2 illustrates an embodiment of system 200 where sand meter 205 is a permanent downhole sand metering sensor disposed adjacent to the bottomhole end of wellbore 120. Alternately, or in addition, sand meter 205 may be disposed at other locations along the fluid flow path of well 106 including other downhole locations along production tubing 170, at wellhead 222, inside surface safety valve 224, locations along flowline 240, inside choke valve 220, inside components or along flowlines downstream from choke valve 220, and the like. In some embodiments, sand meter 205 may include one or more sand metering sensors that are disposed at both downhole and uphole/surface locations along the fluid flow path of well 106. Sand metering sensor(s) 205 may process and manage signals, and guide subsequent interpretation to a monitor (e.g., on SCADA system 270). Sand meter 205 is configured to detect a relative flow rate of sand or slit in the fluid flowing along the flow path of well 106, and in particular, through tubing 170. In some embodiments, sand meter 205 disposed adjacent to the bottomhole end of tubing 170 may operate using one or more intrusive probes to detect erosion of the probe based on the rule of tangible damage detection on the probe's metal components during a sand grain attack. The erosion of the probe increases electrical resistance of sensing elements. Sand erosion rates can then be determined by comparing sand erosion rates against time (e.g., sand production rate or ratio measured in PPM in liquid production). Any suitable technique may be employed to implement sand meter 205 so long as a reasonable measurement of the relative rate or amount of solid particles flowing in the fluid flow path along tubing 170 can be obtained.

Downhole pressure sensor 215 may include one or more downhole pressure sensors that are used to measure the pressure (e.g., flowing bottomhole pressure, corresponding flow rate) downhole in production tubing 170 adjacent to formation 102. As shown in FIG. 2, downhole pressure sensor 215 may be disposed adjacent the bottomhole end of tubing 170. Surface pressure sensor 235 may include one or more uphole pressure sensors that are used to measure the pressure (e.g., flowing wellhead pressure, corresponding flow rate) uphole in flowline 240 adjacent to choke valve 220 and/or at another uphole location that is downstream (or adjacent) to surface safety valve 224 or choke valve 220. A pressure differential can then be determined by subtracting the measured pressure between downhole pressure sensor 215 and surface pressure sensor 235 to determine the pressure drawdown (and corresponding flow rate). Thus, pressure drawdown can be determined as the pressure differential between the flowing bottomhole pressure and the flowing wellhead pressure. Measured sensor data from pressure sensors 215 and 235 can be used to determine the current pressure drawdown and the corresponding fluid flow rate or liquid production rate. Any suitable technique (e.g., pressure transducers, flow meters) may be employed to implement downhole pressure sensor 215 and to implement surface pressure sensor 235 so long as a reasonable measurement of the flowing bottom hole pressure and the flowing wellhead pressure, and the corresponding pressure differential or pressure drawdown (and liquid production rate) can be calculated. The location, number, or type of downhole pressure sensor 215 and surface pressure sensor 235 are not intended to be limiting so long as the flowing bottomhole pressure, the flowing wellhead pressure, and the pressure drawdown (and corresponding fluid production rate) can be detected. Sensor location, number or type may be optimized with experience and/or by analyzing obtained measurement data.

As shown in FIG. 2, sand monitoring and controlling system 200 further includes data acquisition module 260 that is configured to communicate with the plurality of sensors (e.g., sensors 205, 210, 215, 235) of system 200, and receive measurement or sensor data from each of the plurality of sensors. More specifically, data acquisition module 260 may be configured for data communication and control signal communication using one or more predetermined communication modalities (e.g., wireless or wired communication modalities) with the various downhole and uphole/surface sensors (e.g., sand meter 205, metal loss sensors 210, pressure sensors 215 and 235, and the like) of system 200. For example, data acquisition module 260 may be configured to communicate via fiber optic cable 265 that is communicatively coupled between data acquisition module 260 and the various downhole sensors 205, 210, and 215. Fiber optic cable may run from module 260 provided at the surface to the various sensors (e.g., sand meter 205, each of the distributed downhole metal loss sensors 210, downhole pressure sensor 215) disposed downhole in wellbore 120 via wellhead 222. Fiber optic cable 265 may run along the length of wellbore 120 and be disposed in tubing casing annulus 165. Although not shown, module 260 may be similarly configured to communicate via a fiber optic cable (not shown) with the various surface sensors (e.g., metal loss sensor 210 inside choke valve 220, surface pressure sensor 235) such that data acquisition module 260 is communicatively coupled via the fiber optic cable to the various surface sensors.

Alternately, or in addition, module 260 may be communicatively coupled to the downhole sensors wirelessly via fluid harmonics or using electromagnetic signals transmitted downhole via tubular space 175 of production tubing 170 and/or annular space 165 of casing 160. Data acquisition module 260 may similarly be communicatively coupled via fluid harmonics, using electromagnetic signals (e.g., wireless), and the like, to communicate data and control signals with surface or uphole sensors including surface pressure sensor 235, and choke valve integrated metal loss sensor 210. Data acquisition module 260 may further be communicatively coupled to controller 250, and transmit the obtained sensor data (e.g., measurement data) from the various downhole and uphole or surface sensors to controller 250 for performing predetermined sand monitoring and controlling operations (e.g., adjust choke valve setting, shutdown well, display sensor data to operator on SCADA system, notify operator of approaching operating limits, and the like). For example, the sensor data received at data acquisition module 260 may include sand production rate data from permanent downhole sand meter 205 indicating a current rate of sand production (e.g., sand ratio in PPM) in the fluid flow being produced from wellbore 120; real-time metal loss measurement or count data indicating metal thickness loss arising from sand erosion for each of the plurality of metal loss sensors 210; pressure data indicating a current flowing bottomhole pressure and a current flowing wellhead pressure from pressure sensors 215 and 235, respectively; liquid production rate or amount; and the like. In some embodiments, data acquisition module 260 may include a display device that displays the sensor data received from the various downhole and surface sensors.

Controller 250 receives the measured sensor data from data acquisition module 260 and performs various sand monitoring and controlling operations based on the received sensor data. To perform the various sand monitoring and controlling operations, controller 250 implements in hardware (e.g., PLC) and/or software (e.g., program instructions and data), algorithm logic that uses predetermined or predefined data (e.g., threshold data) for automatically controlling choke valve 220 and SSV 224, and displaying data or notifications on SCADA system 270. For example, the predetermined data used by the controller 250 may include the following: a predefined maximum permissible sand erosional velocity ratio limit (e.g., limit value=1); a predefined correlation between sand production rate, pressure drawdown, and maximum sand erosional velocity ratio; a predefined pressure drawdown operating window (e.g., predefined acceptable operating range of the production flow (e.g., minimum and maximum fluid flow rates)); a predefined metal thickness loss limit value; the like. Controller 250 is further communicatively coupled to a choke valve actuator (see FIG. 3; 340) to automatically adjust choke valve 220 to a determined setting position by transmitting a control signal to the actuator, to supervisory control and data acquisition (SCADA) system 270 to display sensor data, and other control and monitoring information to the user, and to ESD 255 to shutdown well 106 in an emergency by transmitting a control signal to the ESD. Details of the operations performed by controller 250 of system 200 to set the choke valve 220 based on sand production rate, monitor the integrity (e.g., metal loss) of components like the surface choke and downhole tubular during the fluid flow, and present the sensor data to the SCADA system operator, are described in detail below in connection with FIGS. 3-10.

Choke valve 220 may be an adjustable choke that enables the fluid flow and pressure parameters to be changed to suit process or production requirements. Choke valve 220 may be adjusted or set (e.g., opened or closed) to an optimum position to closely control the pressure drop/increase. Choke valve 220 can be moved to any position, including fully open or fully closed, within the stroke of the valve (e.g., adjusted in increments of $\frac{1}{64}^{th}$ of an inch). Adjustable choke valve 220 may be constructed to resist wear while high-velocity, solids-laden fluids are flowing by the restricting or sealing elements of the choke. Choke valve 220 may be equipped with or actuated by an actuating system (e.g., choke valve mover 340 in FIG. 3) so that the choke position can be automatically adjusted or set in response to the control signal from controller 250 to the choke valve mover or actuator, and by applying power from an external power source to the actuating system. Any suitable mechanism may be employed to mechanically actuate choke valve 220 between fully open and fully closed positions. For example, the actuating system may be implemented using a hydraulic system, an electric motor, a pneumatic system, and the like. Choke position of choke valve 220 may also be manually adjustable by an operator at the wellsite.

As stated previously, choke valve 220 may be integrally equipped with metal loss sensor 210 to detect metal thickness loss of the elements at the choke point of choke valve 220 arising from sand erosion at speeds approaching real time. For example, choke valve integrated metal loss sensor 210 (or other sensors 210 disposed downhole) can acquire pulses that sand elements produce from impinging on the inside of the choke or tubing/pipe. Sensor placements are particularly effective near locations of greatest impacts, such as near bends. As sand-laden extraction fluids flow past the choke, impingements of solid particles such as sand within the extraction fluid on the restricting or sealing elements of choke valve 220 cause loss of material (e.g., metal) of the choke valve 220. At high differential pressure across the choke, flow accelerations may occur in the choke valve and result in extremely high flow and particle velocities within the choke valve and in the downstream pipes, causing erosion/corrosion over time. Such impact erosion can over time cause loss of performance or even failure of the valve. Uncontrolled failure of the choke valve may cause unacceptable catastrophic leaks and/or downtime of the system. Metal loss sensor 210 integrally provided with choke valve 220 monitors the metal loss (e.g., thickness loss) of elements of choke valve 220 due to erosion in real-time and determines the current metal thickness loss measurement or count value in real-time. Controller 250 performs control operations based on the metal thickness loss measurements from metal loss sensor 210 integrally provided with choke valve 220 (and further based on the metal thickness loss measurements from the other metal loss sensors 210 disposed downhole), so as to determine when (and whether) to automatically shut down well 106 in response to the predefined metal loss limit being reached, thereby preventing leaks or catastrophic failure. By accurately detecting the choke's useful service life under actual production conditions in real-time, controller 250 ensures integrity is system 200.

SCADA system 270 may include hardware and software components used to monitor and control the entire workflow of the integrated sand monitoring and controlling system 200. With SCADA system 270, stakeholders can collect and analyze real-time production data, monitor and manage alarms, and program automatic control responses triggered by certain events or system parameters. More specifically, SCADA system 270 may provide an overview of the entire workflow of system 200 with the functionality of notifying operation/production engineers (e.g., operators) of the measured sensor data approaching threshold limits. For example, SCADA system 270 may present information to an operator including: metal loss measurement data from each of the plurality of metal loss sensors 210 at speeds approaching real-time, corresponding location of the sensor 210 on the fluid flow path or network, and the corresponding approaching predefined metal loss limit(s) for shutting down well automatically; the current sand production rate data from sand meter 205 indicating the proportion of solid particles such as sand within the flowing extraction fluid (e.g., sand ratio in PPM); the current maximum sand erosional velocity ratio determined based on the current sand production rate; the predetermined maximum permissible sand erosional velocity ratio limit (e.g., limit value=1); predetermined acceptable operating window for the pressure drawdown (e.g., acceptable range (minimum-maximum) for the production flow rate); the current pressure drawdown and the corresponding current fluid flow rate (e.g., liquid production amount in bbl); data indicating the current position of choke valve 220; data indicating an automatic adjustment operation of the choke valve position performed by controller 250 so that the maximum sand erosional velocity ratio remains within permissible maximum sand erosional velocity ratio limit, and so that the pressure drawdown remains within the predetermined acceptable pressure drawdown operating window (e.g., pressure drawdown limit); data indicating automatic well shutdown operation performed by controller 250 based on the metal loss measurements from one or more identified metal loss sensors 210 reaching the threshold metal thickness loss limit; and the like. SCADA system 270 may further be configured to notify (e.g., issue an alarm) an operator based on the sensor data approaching threshold limits (e.g., when a metal thickness loss measurement from a particular metal loss sensor is approaching its threshold thickness loss limit, when current maximum sand erosional velocity ratio is approaching the predetermined maximum permissible sand erosional velocity ratio limit, and the like).

Surface safety valve (SSV) 224 may be a hydraulically actuated fail-safe gate valve for controlling production from wellbore 120. SSV 224 may be installed upstream of choke valve 220 and adjacent to wellhead 222. SSV 224 is used to quickly shut down well 106 in the event of an ESD condition that triggers controller 250 to transmit a control signal to ESD 255. SSV 224 may also be used to shutdown well 106 in the event of overpressure, failure, a leak in downstream equipment, or any other well emergency requiring an immediate shut down. SSV 224 can be remotely operated by ESD 255, which can be triggered automatically by high- or low-pressure pilot actuators, based on receipt of a control signal from controller 250 instructing shutdown of the well. ESD 255 and SSV 224 thus provide a mechanism for immediate well closure based on the determination of controller 250.

Figure 3:
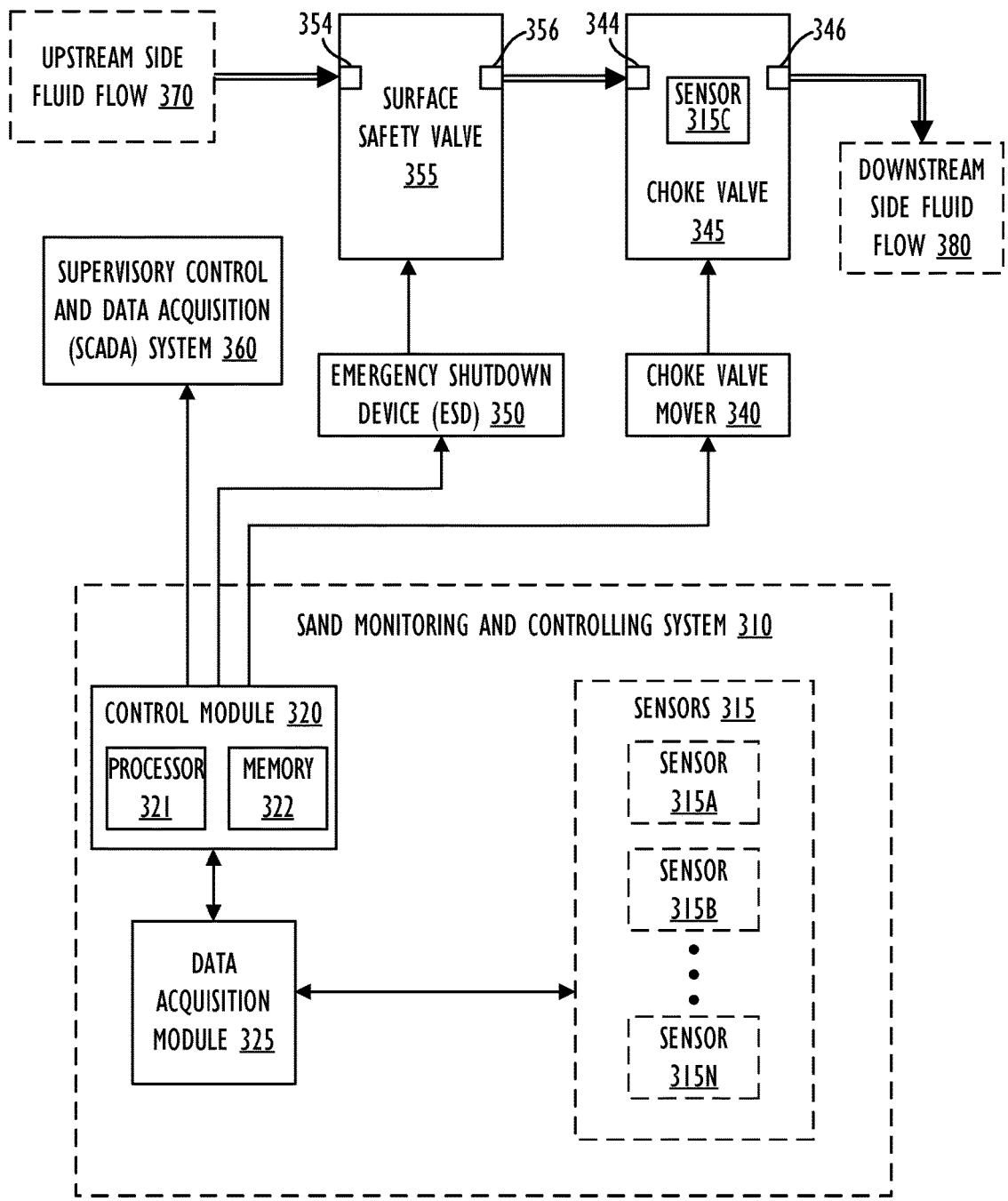
FIG. 3 is a block diagram of the integrated sand monitoring and controlling system in accordance with one or more embodiments.

FIG. 3 shows block diagram 300 of sand monitoring and controlling system 310 in accordance with one or more embodiments. As shown in FIG. 3, sand monitoring and controlling system 310 includes sensors 315, control module 320, and data acquisition module 325. Sensors 315 (e.g., sensor 315A, sensor 315B, . . . , sensor 315N) include one or more of a plurality of types of sensors. For example, sensors 315 may include one or more sand meter sensors, multiple distributed metal loss sensors, pressure sensors, an optical, light or imaging sensor, a flow or fluid velocity sensor (e.g., flow sensor, flowmeter, and the like), a thermal, heat or temperature sensor, a position, angle, displacement, distance, or speed sensor (e.g., laser rangefinder and the like), a barometric sensor, a vibration sensor, a magnetometer, a thermistor sensor, an electrostatic sensor, a differential light sensor, a velocity sensor, a momentum sensor, a wave radar probe, a pressure gauge, pressure transducer, current leakage sensor, and the like. A pressure transducer measures pressures with an output voltage linear with pressure. As explained above in connection with FIG. 2, sensors 315 (e.g., sensors 205, 210, 215, 235 in FIG. 2) may be disposed at different locations (e.g., downhole locations, uphole/surface locations) of the well system and may be configured to detect (e.g., sense) different types of sensor data. The number, type, position, location, angle, and other characteristics of sensors 315 are not intended to be limiting, and may be determined based on the well and so as to enable functionality of sand monitoring and controlling system 310 as described herein.

Data acquisition module 325 (which may include one or more interfaces) may provide for communication between control module 320 and sensors 315. For example, data acquisition module 325 may include circuitry for communication with downhole and surface pressure sensors, permanent downhole sand meter, distributed downhole metal loss sensors, choke valve integrated metal loss sensor, and other components of the well system including sand monitoring and controlling system 310. Data acquisition module 325 may include a wired interface or a wireless interface and may be configured for communication over wired networks or wireless networks. In some embodiments, data acquisition module 325 may enable communication over industrial control networks. Data acquisition module 325 may provide for communication using suitable standards, protocols, and technologies, such as serial communication protocols (e.g., Modbus), Industrial Ethernet (IE), the Common Industrial Protocol (CIP), and the like.

Figure 11:
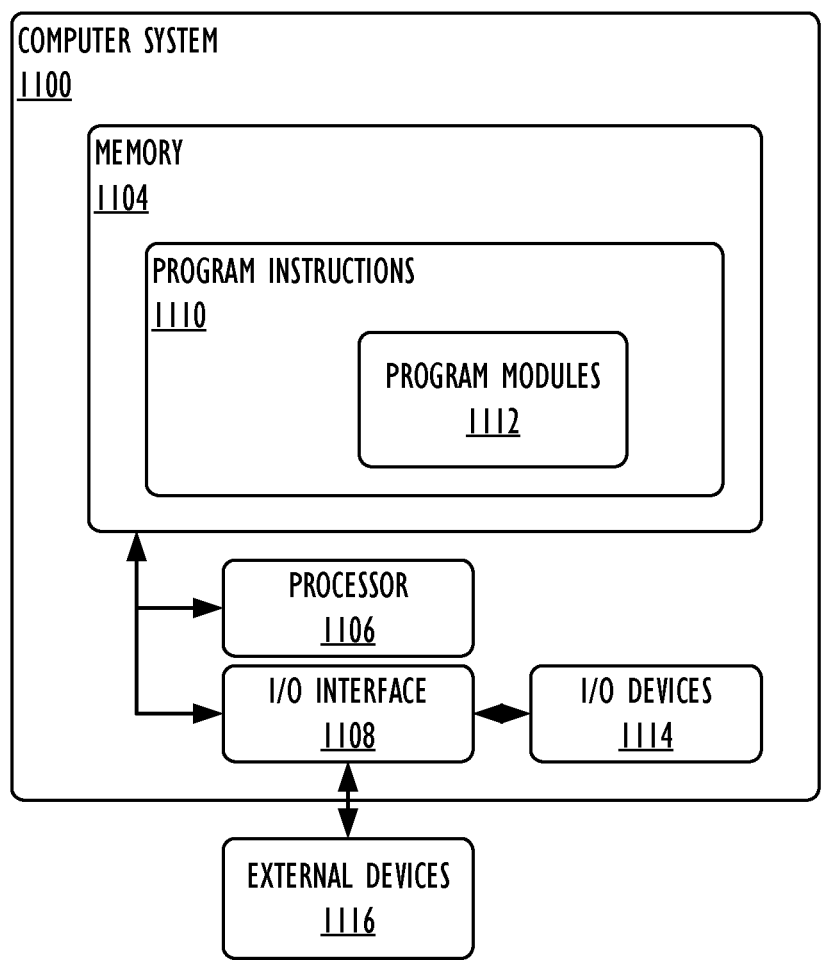
FIG. 11 is a functional block diagram of an exemplary computer system in accordance with one or more embodiments.

Control module 320 of sand monitoring and controlling system 310 may be implemented on a computer system that is the same as or similar to computer system 1100 described with regard to at least FIG. 11. Control module 320 may be communicatively coupled to choke valve mover 340, ESD 350, SCADA system 360, and data acquisition module 325. Control module 320 may be configured to automatically control operation of choke valve 345, surface safety valve 355, and SCADA system 360, based on sensor data received from one or more sensors 315, and based on control logic or instructions implemented at control module 320 and based on predetermined data stored, e.g., at memory 322. Control module 320 may also be configured to store in a storage device (e.g., memory 322) the received sensor data and corresponding automated (or user controlled) operations of control module 320 for choke valve adjustment or emergency shutdown.

Control module 320 may include processor 321 and memory 322. Processor 321 (e.g., programmable logic controller (PLC), microprocessor, and the like) may include one or more processors having the capability to receive and process sensor 315 data received from data acquisition module 325 of system 310. In some embodiments, processor 321 may include an application-specific integrated circuit (AISC). In other embodiments, processor 321 may include a reduced instruction set computer (RISC) processor. Additionally, processor 321 may include single-core processor, multicore processors, and/or may include graphics processors. Multiple processors may be employed to provide for parallel or sequential execution of one or more of the techniques described in the disclosure. Processor 321 may receive instructions and data (e.g., predetermined or predefined data, threshold data) from memory (e.g., memory 322).

Memory 322 (which may include one or more tangible non-transitory computer readable storage mediums) of control module 320 may include volatile memory, such as random access memory (RAM), and non-volatile memory, such as ROM, flash memory, a hard drive, any other suitable optical, magnetic, or solid-state storage medium, or a combination thereof. Memory 322 may be accessible by processor 321 and may store executable computer code. The executable computer code may include computer program instructions for implementing one or more techniques described in this disclosure. For example, the executable computer code may include instructions for acquiring data from sensors 315 via data acquisition module 325 and processing the acquired data (e.g., converting the data from analog data to digital data); instructions to transmit obtained sensor 315 data to SCADA system 360 to present the sensor data to an operator and notify the operator of approaching threshold limits; instructions to obtain or determine maximum sand erosional velocity ratio and pressure drawdown based on the measured sensor data; instructions to determine optimum choke valve setting based on the predefined correlation between sand production rate, pressure drawdown, and maximum sand erosional velocity ratio; instructions to control choke valve mover 340 to set choke valve 345 at determined optimum choke valve setting; instructions to determine whether an ESD condition is detected based on obtained measurement data and the predefined metal loss limit; instructions to control ESD 350 to shutdown well by actuating surface safety valve 355 based on detection of the ESD condition; and the like. In some embodiments, the processing by control module 320 may include comparing an acquired or calculated data value (e.g., metal thickness loss count or value, maximum sand erosional velocity ratio, pressure drawdown) to a threshold value or limit or window (e.g., predefined metal thickness loss limit value, predefined maximum sand erosional velocity ratio limit value, pressure drawdown operating window or limit value) and providing a notification based on the comparison. The processing by control module 320 may further include automatically performing predetermined actions or operations (e.g., adjust choke valve, shutdown well) based on the comparison. Process instructions of control module 320 may also be implemented at least in part in hardware by using, for example, PLC.

In addition to process instructions (e.g., control logic, algorithm logic), memory 322 of control module 320 may store predetermined or predefined data (e.g., threshold data) that may be used by processor 321 to perform the control operations based on sensor data. The predetermined data used by control module 320 may include data representing: a predefined maximum permissible sand erosional velocity ratio limit (e.g., maximum permissible rate of sand erosion on components along the fluid flow path like downhole tubulars, joints, surface flow lines, choke valve, and the like); a predefined correlation between sand production rate, pressure drawdown, and maximum sand erosional velocity ratio; a predefined pressure drawdown operating window (e.g., predefined acceptable operating range of the production flow (e.g., minimum and maximum fluid flow rates), optimum fluid flow rate range that meets predetermined rate commitments); a predefined metal thickness loss limit value (e.g., maximum permissible thickness loss count detectable by a metal loss sensor for a component (or section/region thereof) along the fluid flow path like production tubular, joint, flow line, choke valve, and the like); and the like.

As the differential pressure represented by the pressure drawdown is higher, the production flow rate or amount of the fluid flowing through the wellbore is higher. If the rate of sand production (e.g., solid particle count ratio in PPM) at such a high pressure drawdown (or high production rate, high flow rate) is also high, the resulting fluid flow will have a high erosive effect on components of the flow path like production tubulars, joints, chokes, valves, flow lines, and the like (e.g., high maximum sand erosional velocity ratio; high sand erosion rate). By contrast, even with the high pressure drawdown (e.g., high production flow rate), if the sand production rate (e.g., rate of sand in PPM) is low, the resulting high flow rate with low rate of sand blended in will have a lower erosive effect on the components along the fluid flow path (e.g., low maximum sand erosional velocity ratio). Further, if the pressure drawdown is lowered by adjusting the choke valve (e.g., lower production flow rate) due to the high sand rate, the sand production rate and the resultant erosive effect on components along the fluid flow path can be lowered (e.g., lower maximum sand erosional velocity ratio).

The predefined correlation between sand production rate, pressure drawdown, and maximum sand erosional velocity ratio, stored as the predetermined data in memory 322 and used by control module 320 to perform sand monitoring and control operations, takes into consideration the above described relationship between sand production rate, pressure drawdown, and maximum sand erosional velocity ratio, in setting the choke valve at the optimum position based on the current sand rate. For practical purposes, the operating pressure drawdown is the difference between the flowing bottom hole pressure and the flowing wellhead pressure. This difference enables operators and engineers to establish a relatively safe operating window for the pressure drawdown. From the pressure drawdown operating window, the correlation between the sand production rate, the pressure drawdown, and the maximum sand erosional velocity ratio can be predefined and stored in memory for use in adjusting choke valve setting based on sand ratio. Relation between sand ratio, pressure drawdown, and maximum sand erosional velocity ratio is explained in further detail below with help of two exemplary scenarios illustrated in FIGS. 4-9.

To determine the maximum sand erosional velocity ratio for a given sand production rate and a given liquid production rate measured by sensors 315, first, erosional velocity may be determined using techniques known to those skilled in the art. For example, the erosional velocity may be calculated by using the following erosional velocity equation of the Salama model:

$$V_e = \sqrt{\frac{S_m * ER_a * D^2 * \rho_m}{W * d}}$$

Where
Ve=Erosional velocity (Salama)
$S_m$=Geometry Constant
$ER_a$=Acceptable Erosion Rate (mm/yr), e.g. 01. Mm/y or 0.003937 in/y
D=Pipe ID (mm)
$\rho_m$=Mixture Density (kg/m$^3$)
W=Sand Rate (Kg/day)
d=Sand Grain Size (micron)

Using the above equation, erosional velocity is calculated for each of two exemplary scenarios having two different sand ratios (sand production rate) for the same liquid production (pressure drawdown). In the first exemplary scenario, using silica as the sand material (density=2650 kg/m3), 5 kg sand is input as being entrained in 25,083 bbl liquid production, representing a sand ratio (e.g., sand production rate, sand concentration) of 0.473812 ppm. In the first exemplary scenario, the erosional velocity is determined to be 31.6272 m/s using the above equation of the Salama model.

In the second exemplary scenario, again using silica as the sand material (density=2650 kg/m3), 10 kg sand is input as being entrained in the same (i.e., 25,083 bbl) liquid production, representing a sand ratio (e.g., sand production rate, sand concentration) of 0.947624 ppm. In the second exemplary scenario, the erosional velocity is determined to be 22.3617 m/s using the above equation of the Salama model. The above information is input into physics correlation software (e.g., PIPESIM software developed by Schlumberger Limited, Houston, Tex.) to investigate sand erosion for both exemplary scenarios. To accommodate the sand ratios for both exemplary scenarios for the erosional velocity ratio calculations, the following code is inserted in simulation settings for the physics correlation software.

Figure 4:
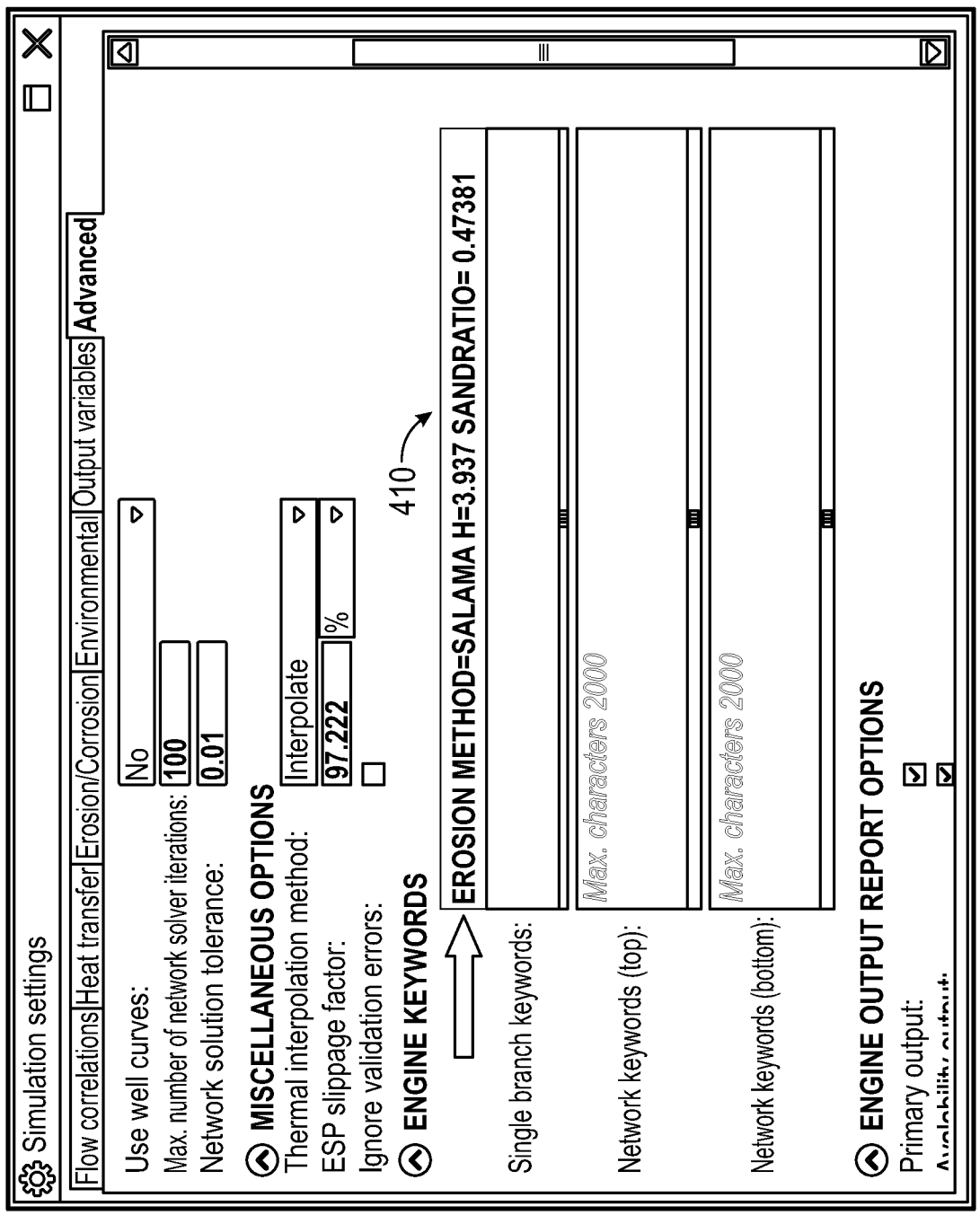
FIG. 4 illustrates simulation settings for computing a maximum sand erosional velocity ratio for a first exemplary scenario with a low sand rate in accordance with one or more embodiments.
Figure 5:
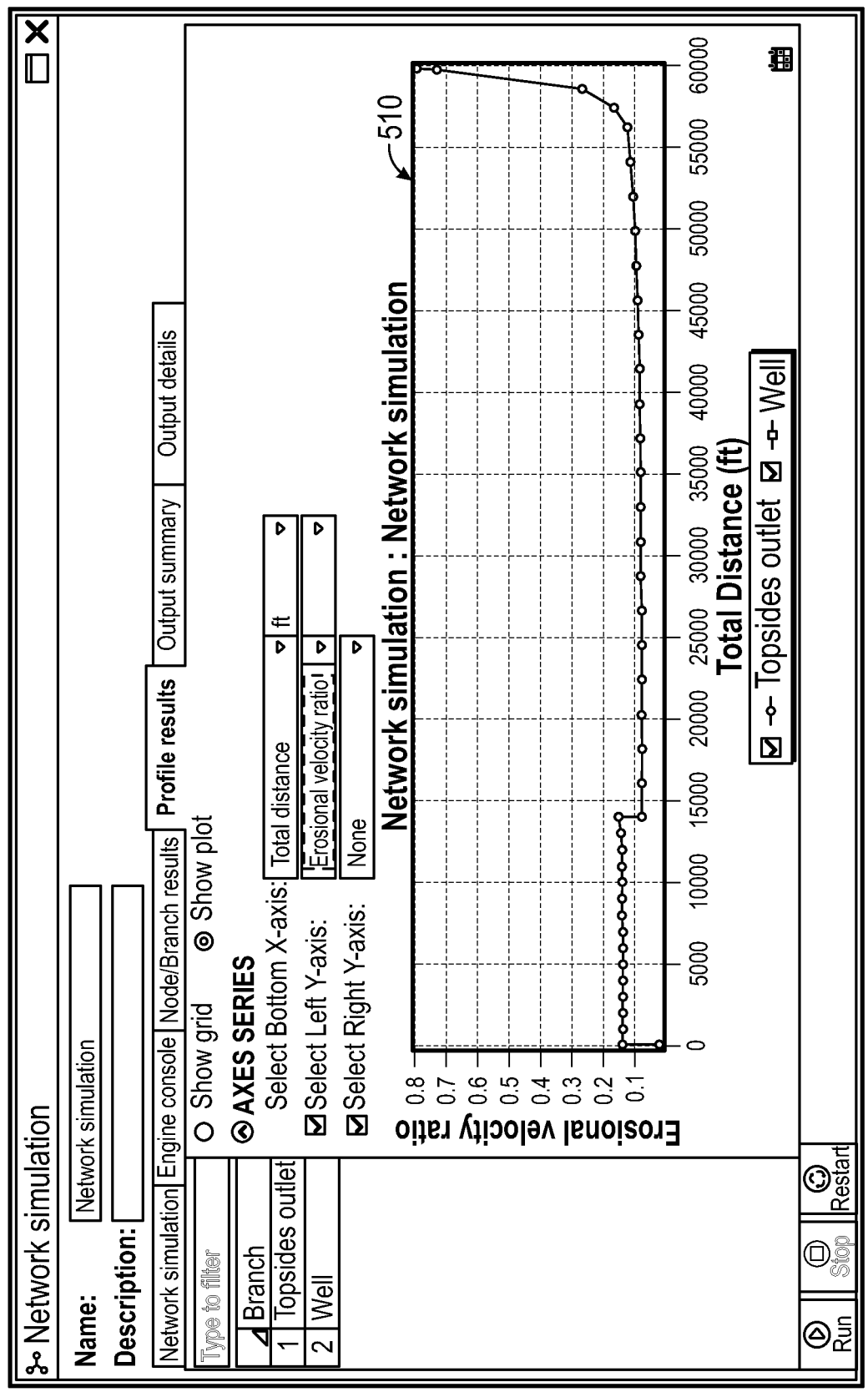
FIG. 5 illustrates estimated erosional velocity ratios across the entire network for the first exemplary scenario in accordance with one or more embodiments.
Figure 6:
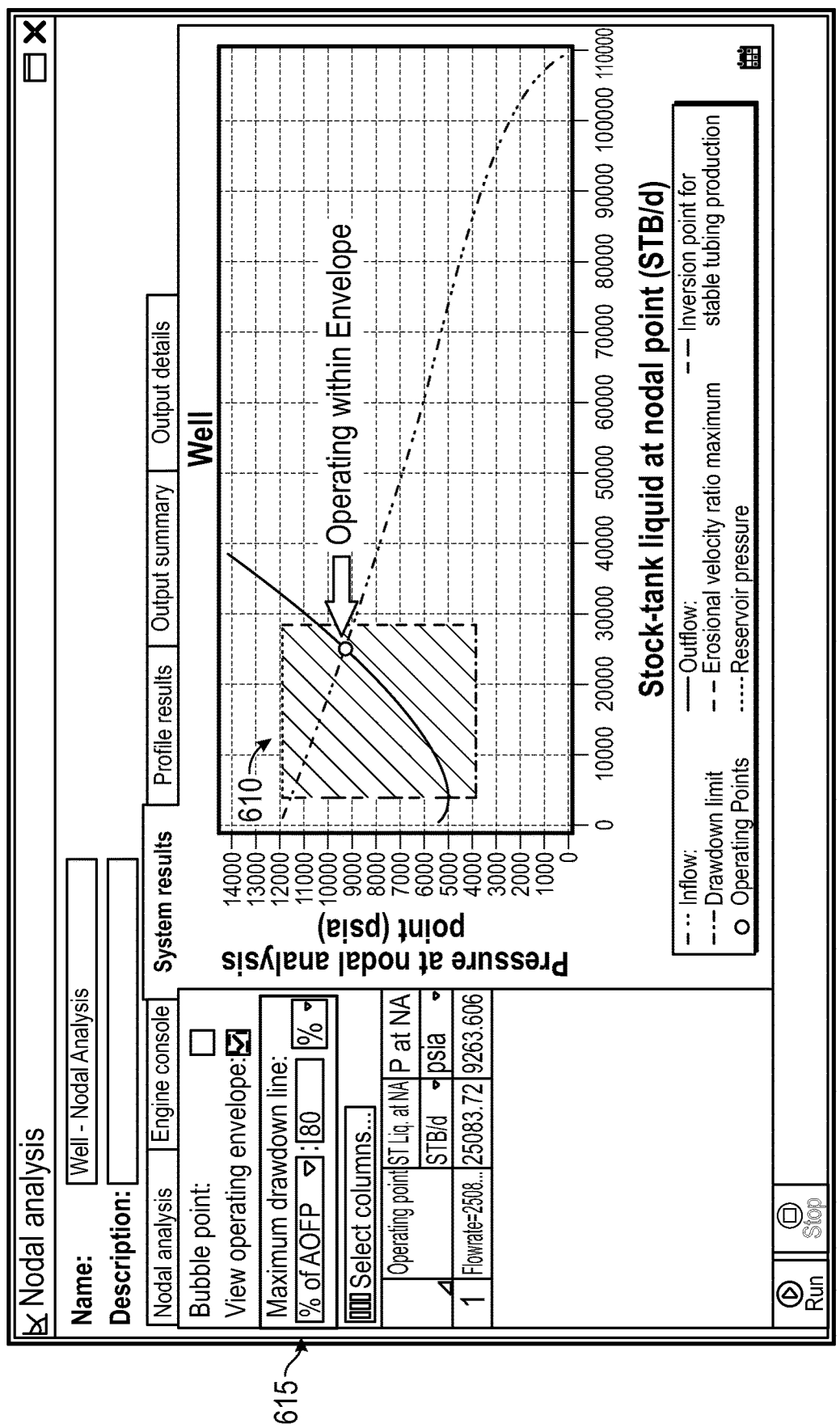
FIG. 6 illustrates simulation results for the first exemplary scenario showing well operation is within maximum sand erosional velocity ratio limit in accordance with one or more embodiments.

In the first exemplary scenario, the simulation settings for 5 kg sand entrained in 25,083 bbl liquid production (0.473812 ppm sand ratio) would be input at 410 as shown in FIG. 4. At the relatively lower sand concentration (0.47381 ppm) of the first exemplary scenario, erosion does not appear to be a significant threat as revealed from the estimated erosional velocity ratio-total distance cross plot 510 in FIG. 5, which shows erosional velocity ratio values of less than 1 for flowrates expected throughout the network, where the threshold limit or predetermined maximum erosional velocity ratio limit value=1. Thus, in the first exemplary scenario having the given sand production rate (e.g., 0.47381 ppm) and the given pressure drawdown or production rate (e.g., 25,083 bbl liquid production), the determined maximum sand erosional velocity ratio is determined to be within the predefined maximum sand erosional velocity ratio limit (ratio values of less than 1 in FIG. 5). Further, as shown in FIG. 6, an operating envelope 610 is defined showing the area bordered by the inflection point for unstable production of liquid, a given maximum drawdown limit (e.g., 0.80 times the absolute open flow potential; 615), maximum erosional velocity ratio limit (e.g., limit value=1), and the reservoir pressure. As FIG. 6 shows, the well with lower sand concentration of the first exemplary scenario is within its operating envelope 610 (e.g., maximum sand erosional velocity ratio is within the predefined maximum sand erosional velocity ratio limit, and the measured pressure drawdown is determined to be within the predetermined pressure drawdown operating window (e.g., within drawdown limit)). Hence, in the first exemplary scenario, controller 320 will automatically determine that there is no major cause for worry, and no need to choke the well back.

Figure 7:
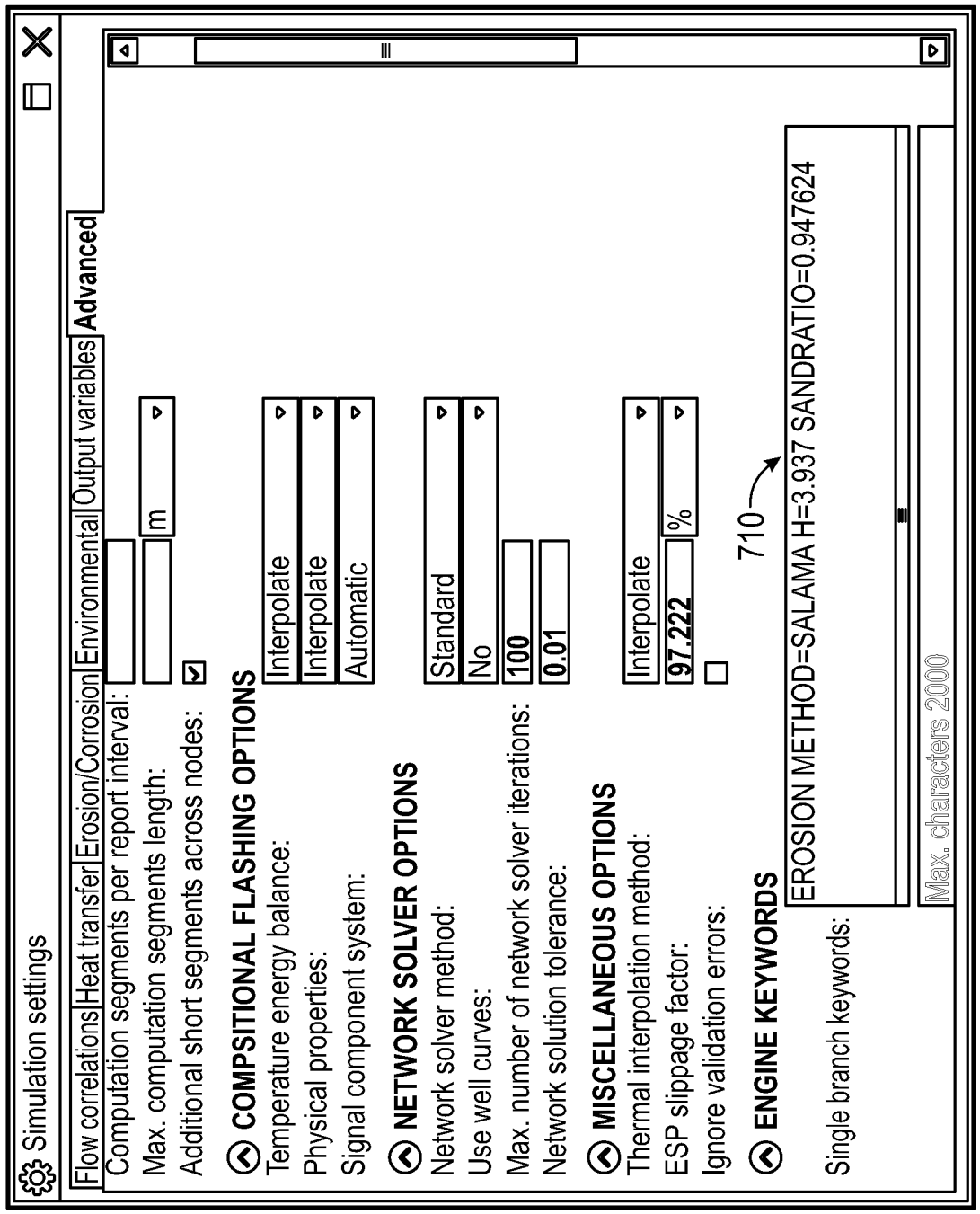
FIG. 7 illustrates simulation settings for computing a maximum sand erosional velocity ratio for a second exemplary scenario with a high sand rate in accordance with one or more embodiments.
Figure 8:
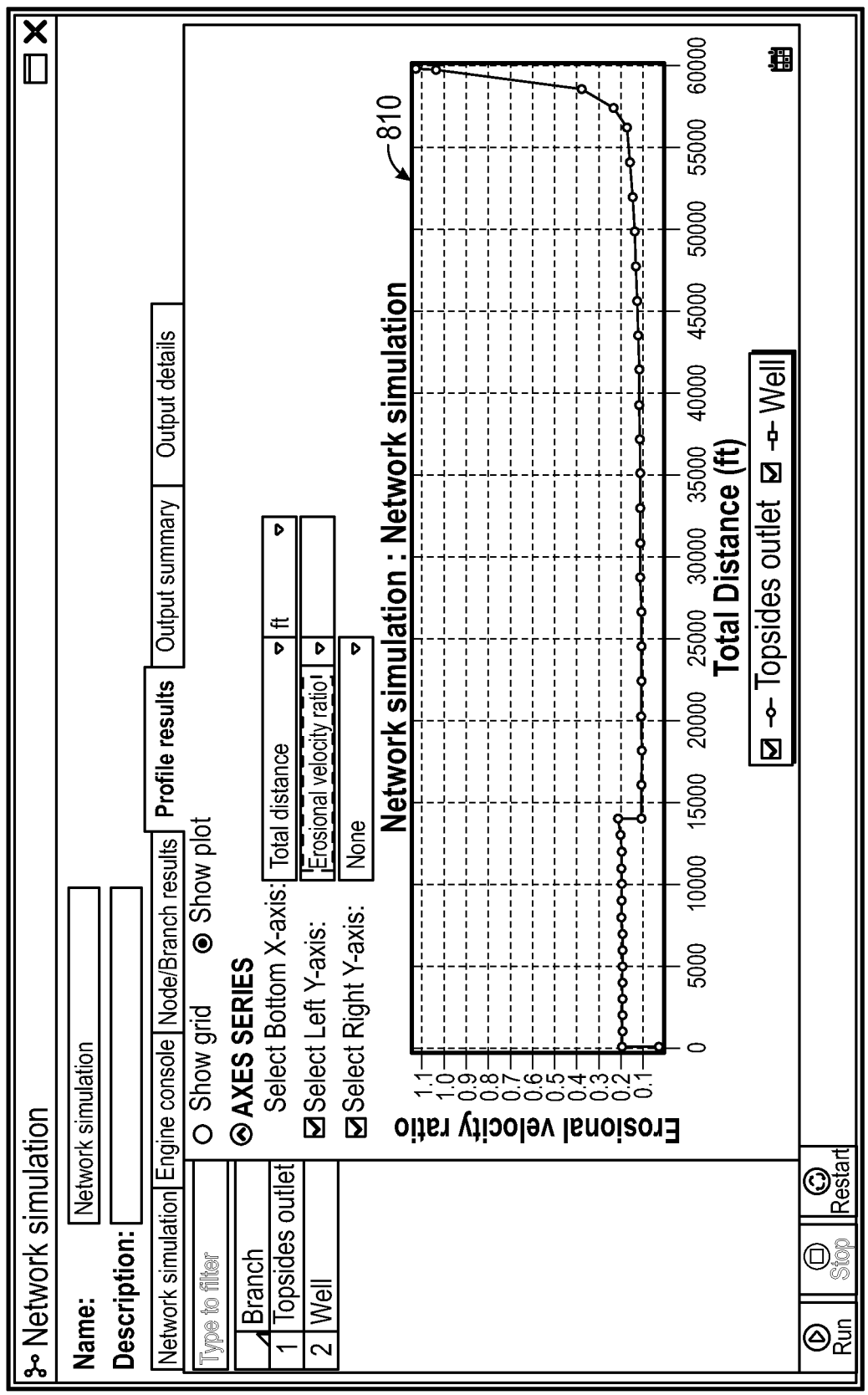
FIG. 8 illustrates estimated erosional velocity ratios across the entire network for the second exemplary scenario in accordance with one or more embodiments.

In the second exemplary scenario, the simulation settings for 10 kg sand entrained in 25,083 bbl liquid production (0.947624 ppm sand ratio) would be input at 710 as shown in FIG. 7. At the relatively higher sand concentration (0.947624 ppm) of the second exemplary scenario, erosion appears to be a significant threat as revealed from the estimated erosional velocity ratio-total distance cross plot 810 in FIG. 8, which shows erosional velocity ratio values of more than 1 for flowrates expected throughout the network, where the threshold limit or predetermined maximum erosional velocity ratio limit value=1. Thus, in the second exemplary scenario having the given sand production rate (e.g., 0.947624 ppm) and the given pressure drawdown or corresponding liquid production rate (e.g., 25,083 bbl liquid production), the maximum sand erosional velocity ratio is determined to be higher than the maximum sand erosional velocity ratio limit (erosional velocity ratio values>1 in FIG. 8).

Figure 9:
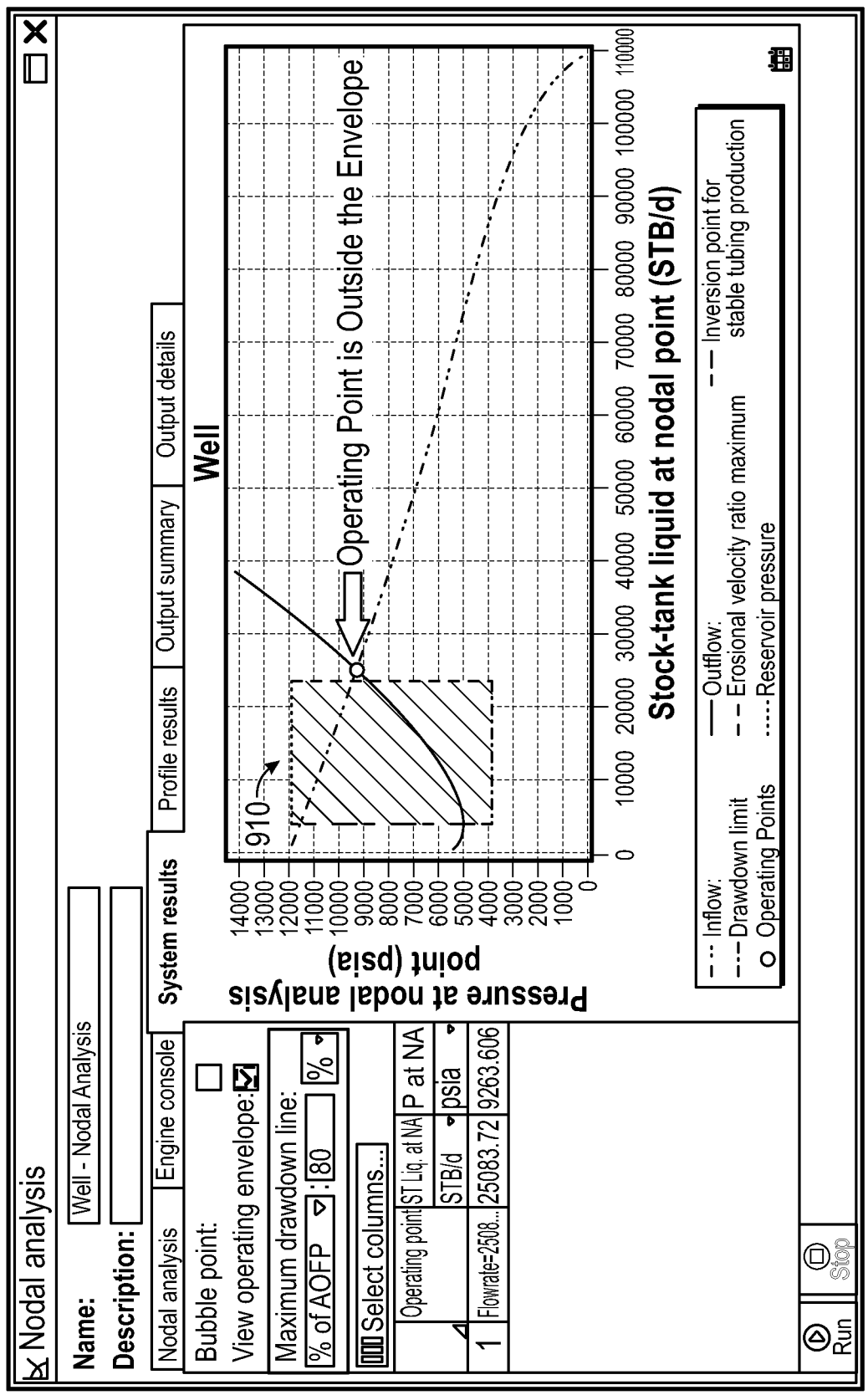
FIG. 9 illutrates simulation results for the second exemplary scenario showing well operation is not within the maximum sand erosional velocity ratio limit in accordance with one or more embodiments.

Further, as shown in FIG. 9, an operating envelope 910 is defined showing the area bordered by the inflection point for unstable production of liquid, a given maximum drawdown limit (e.g., 0.80 times the absolute open flow potential), maximum erosional velocity ratio limit (e.g., limit value=1), and the reservoir pressure. As shown in FIG. 9, at the measured sand production rate (e.g., 0.947624 ppm) and the measured pressure drawdown of the second exemplary scenario, the flowrate (e.g., 25,083 bbl liquid production) at the higher sand concentration (e.g., 0.947624 ppm) causes the erosional velocity ratio values (FIG. 8) to be in excess of the maximum erosional velocity ratio limit (e.g., limit value=1). As a result, the well with the higher sand concentration of the second exemplary scenario is outside its operating envelope 910 (e.g., maximum sand erosional velocity ratio is higher than the predefined maximum sand erosional velocity ratio limit, the measured pressure drawdown is determined to be outside the predetermined pressure drawdown operating window). Hence, in the second exemplary scenario, controller 320 will automatically determine that there is a need to choke the well back to some extent. The first and second exemplary scenarios are summarized in the following table:

|  | First Exemplary Scenario | Second Exemplary Scenario |
|---|---|---|
| Sand Concentration, ppm | 0.473812 | 0.947624 |
| Liquid volume, bbl | 25,083 | 25,083 |
| Wellhead Pressure, psi | 200 | 200 |
| Maximum Erosional Velocity Ratio | 0.79060 | 1.11808 |
| Maximum Erosional Velocity, m/s | 31.62772 | 22.36417 |
| Sand mass, kg in 25,083 bbl oil | 5 | 10 |
| Flowing Bottom hole pressure, psia | 9263.606 | 9263.606 |
| Maximum Erosion Rate at Riser, in/a | 2.458015 | 4.916031 |
| Flowing Wellhead Temperature, deg F. | 352.896 | 352.896 |
| Depth at which gas appears, ft. | Between 1500 and 1749.5 ft | Between 1500 and 1749.5 ft |
| Operating within Maximum Erosional Velocity Ratio Limit? | Yes | No |

As illustrated by the above exemplary scenarios, at the same flow rate and wellhead pressure, the well with higher sand concentration in fluid would have a higher maximum erosional velocity ratio than a well with a lower sand concentration. The fluid with higher sand concentration also has higher erosion rate. Also, at higher sand concentration, the well seems more prone to flowing outside its safe operating envelope than the well with lower sand concentration (FIGS. 6 and 9). Achieving a higher production rate to meet rate commitments may often necessitate production at a higher pressure drawdown. If the rate of sand per unit flow is low (e.g., low sand production rate; first exemplary scenario), the resulting high flow rate with low rate of sand blended in will have a lower erosive effect on the components along the fluid flow path (e.g., maximum sand erosional velocity ratio lower than maximum sand erosional velocity ratio limit). And if the rate of sand per unit flow is high (e.g., high sand production rate; second exemplary scenario), the resulting high flow rate with high rate of sand blended in will have a higher erosive effect on the components along the fluid flow path (e.g., maximum sand erosional velocity ratio higher than maximum sand erosional velocity ratio limit). The Control module 320 uses the measured sensor data and the predefined correlation between sand production rate, pressure drawdown, and maximum sand erosional velocity ratio to keep the well operating within the pressure drawdown operating window, while maintaining erosion to be within the predefined maximum erosional velocity ratio limit, regardless of the changing sand production rate, by automatically adjusting the choke valve setting.

Returning to FIG. 3, based on the determination by control module 320 regarding whether choke valve 345 needs to be adjusted based on the determined maximum sand erosional velocity ratio value, choke valve 345 can then be adjusted (opened or closed) to an optimum setting that produces a desired pressure drawdown (e.g., desired production rate or flow rate; optimum pressure drawdown, new or updated pressure drawdown, pressure drawdown that is within drawdown pressure operating window or drawdown limit) that will keep the maximum sand erosional velocity ratio value within the permissible maximum sand erosional velocity ratio limit.

During operation of a well system equipped with sand monitoring and controlling system 310, sand metering sensor 315 installed permanently downhole inside the wellbore measures a solid particle count rate (e.g., sand production rate) in the fluid flowing into the wellbore from the reservoir formation. Distributed metal loss sensors 315 disposed downhole along the production tubing and inside choke valve 345 on the surface provide metal thickness loss measurements (e.g., metal thickness loss count or value) across the downhole production tubular and for elements (e.g., restricting or sealing elements) at the choke point of choke valve 345. Downhole and surface pressure sensors 315 also detect the flowing bottomhole pressure and the flowing wellhead pressure associated with the well. Measured data from sensors 315 is transmitted to data acquisition module 325 (e.g., via fiber optic cable), which is communicatively coupled to control module 320 that implements an algorithm in hardware (e.g., PLC) and/or software (e.g., process instructions stored in memory 322 and executed by processor 321) and that is configured to perform analysis based on the actual measurement data and the predetermined data stored in memory 322 to perform automated operations on SSV 355 and choke valve 345.

For example, based on the current sand production rate measured by the sand meter sensor, and the current pressure drawdown (e.g., current production rate or flow rate; to be maintained within pressure drawdown operating window) detected by the pressure sensors, control module 320 determines the current maximum sand erosional velocity ratio (e.g., rate at which the current sand-laden fluid flow is eroding components along the flow path). Further, the control module 320 may determine whether the current determined maximum sand erosional velocity ratio is within a predetermined permissible maximum sand erosional velocity ratio limit (e.g., ratio limit value=1 in the two exemplary scenarios of FIGS. 4-9) stored in memory 322. If control module 320 determines that the current determined maximum sand erosional velocity ratio is not within the predetermined permissible maximum sand erosional velocity ratio limit, control module 320 may determine a new pressure drawdown (e.g., corresponding to a new lower production rate or flow rate within drawdown operating window or limit) that will produce a (e.g., lower) sand production rate or sand particle count rate and a corresponding new (e.g., lower) maximum sand erosional velocity ratio that is within the predetermined permissible maximum sand erosional velocity ratio limit, based on the predefined correlation between pressure drawdown, sand production rate, and maximum sand erosional velocity ratio stored in memory 322.

In determining the new pressure drawdown, the control module 320 thus also takes into consideration the predetermined pressure drawdown operating window for proper erosion control and monitoring, while honoring rate commitments. That is, control module 320 may take into consideration the stored pressure drawdown operating window (e.g., optimum fluid flow rate range that meets predetermined rate commitments, optimum production rate) to ensure the new determined pressure drawdown is within the pressure drawdown operating window. Control module 320 may then determine the optimum level of adjustment of choke valve 345 (e.g., stroke position or value of choke valve 345) that will produce the determined new pressure drawdown (e.g., production rate or flow rate), and control choke valve mover 340 based on the determined choke valve position.

Control module 320 may further be configured to monitor in real-time the metal loss measurement data from the distributed downhole and surface metal loss sensors to determine whether metal loss sensor measurements or counts for erosion values from any of the plurality of metal loss sensors are approaching a predefined metal thickness loss limit stored in memory 322. Control module 320 may be configured to control ESD 350 to shutdown the well immediately by closing surface safety valve 355 in case the predefined metal thickness loss limit for any of the metal loss sensors 315 is determined to be reached. Control module 320 thus supervises the production workflow within the well lifecycle, and provides means to monitor the integrity of both surface choke and downhole tubular during the course of well production. Control module 320 may perform the above operations repeatedly (e.g., periodically or irregularly based on predetermined events or user operation) based on receipt of sensor data at speeds approaching real-time to repeatedly and automatically adjust (open or close in a step-wise manner) the choke valve, as needed, based on the sand rate, and to shutdown the well, if needed, based on the predefined metal loss limit.

Choke valve mover 340 may be operable based on a control signal received from control module 320 to automatically and finely adjust or set the choke position or stroke position of choke valve 345 to an optimum value, and using an external power source to power choke valve mover 340. Choke valve mover 340 may employ any suitable mechanism to mechanically and automatically (or manually) actuate choke valve 220 between fully open and fully closed positions. For example, choke valve mover 340 may be implemented using a hydraulic system, an electric motor, a pneumatic system, and the like. ESD 350 may be operable based on a control signal received from control module 320 to automatically trigger high- or low-pressure pilot actuators that operate to close the well immediately from hydraulic surface safety valve 224, as needed, based on the predefined metal loss limit being reached. As shown in FIG. 3, fluid (e.g., production flow) flowing through the fluid flow path from upstream (downhole) side 370 enters surface safety valve 355 at the wellhead via inlet 354, and flows further downstream from surface safety valve 355 via outlet 356. SSV 355 is fluidly coupled to choke valve 345 disposed further downstream along the fluid flow path via a flow line, and the fluid enters choke valve 345 (equipped with integrated metal loss sensor 315C) via intake 344, flowing by the restricting or sealing elements of the adjustable choke that adjust the fluid flow rate, and flows further downstream (380) from choke valve 345 via outlet 346.

SCADA system 360 may be configured to receive from control module 320, the predetermined data stored in memory 322, the sensor data obtained from data acquisition module 325, and data representing the corresponding control operations performed by control module 320 to prevent tubular and choke valve failures, control the flow rate of choke valve 345, and shutdown the well. SCADA system 360 may display the data received from control module 320 on a display to provide an overview of the entire workflow of the integrated system to an operator. SCADA system 360 may further be configured to notify an operation/production engineer of the measured sensor data and corresponding approaching predefined operating limits included in the predefined data stored in memory 322.

Sand monitoring and controlling system 310 thus provides an integrated system that enables monitoring and control of sand production rate, and corresponding maximum sand erosional velocity ratio and metal loss, in order to limit the maximum sand erosional velocity ratio below permissible maximum sand erosional velocity ratio limit and thus, maintain integrity of tubulars and surface choke valve for safe and environmental operation of the well. Sand monitoring and controlling system 310 adaptively monitors and controls the erosive effect of sand from sand-prone wells during their course of production. Sand monitoring and controlling system 310 ensures the integrity of subsurface wellhead tubulars, wellhead valves, choke valve and surface production network, thereby preventing considerable environmental and safety hazards, and commercial consequences from delayed production and extra running costs. Integrated sand monitoring and controlling system 310 provides an effective management system for the entire sand production and resulting metal loss during well lifecycle to prevent failures of downhole tubulars and choke valves. System 310 is capable of shutting down the well immediately in case sand erosion adversely affects tubing and chokes through severe and unacceptable metal loss measurements. System 310 adaptively provides optimum choke positions through a predefined correlation between sand production rate, pressure drawdown and maximum sand erosional velocity ratio based on an acceptable sand production level philosophy. Further, system 310 serves as an early warning system, which can provide notifications to operation and production engineers about the actual measurements and include alarms, if the values approach set limits.

Figure 10:
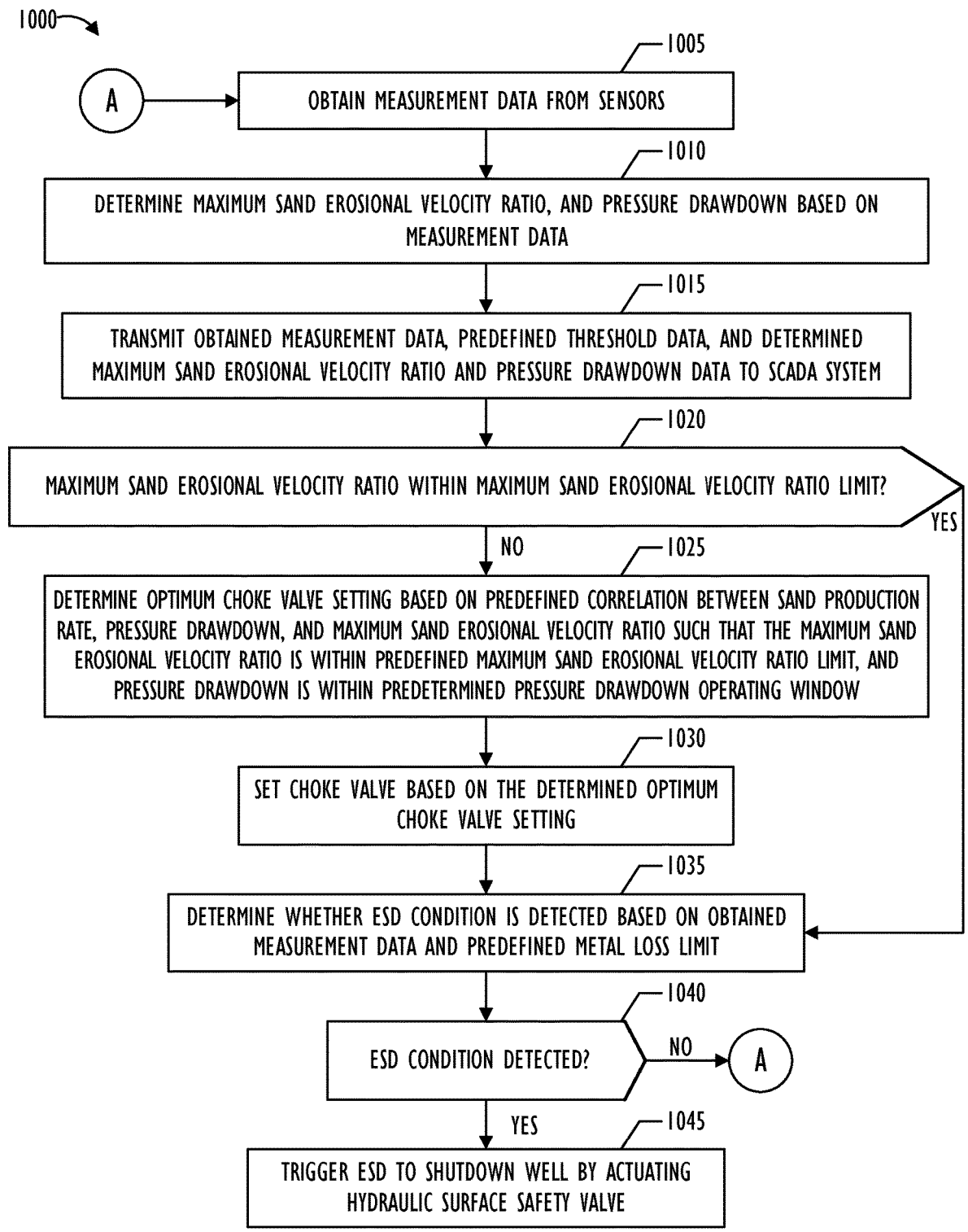
FIG. 10 is a flow chart that illustrates a method of operation of the integrated sand monitoring and controlling system on sand-prone wells in accordance with one or more embodiments.

FIG. 10 is a flow chart that illustrates method 1000 of operation of the integrated sand monitoring and controlling system on sand-prone oil and gas wells in accordance with one or more embodiments. Method 1000 starts at block 1005 where a controller (e.g., controller 250 in FIG. 2, control module 320 in FIG. 3) obtains measurement data from a plurality of sensors (e.g., sensors 205, 210, 215, 235 in FIG. 2 or sensors 315 in FIG. 3). At block 1005, the controller may obtain sensor data from a permanent downhole sand meter indicating a solid particle count rate (e.g., sand production rate; sand ratio) in a fluid flowing from the reservoir into the wellbore at the bottomhole of the well. The controller at block 1005 may further obtain sensor data from each of a plurality of metal loss sensors that are dispersed along a fluid flow path of the well at locations downhole inside the wellbore as well as at locations uphole, on the surface.

For example, the plurality of metal loss sensors may include sensors disposed along the production tubular downhole inside the wellbore to detect inner metal thickness loss due to sand erosion/corrosion across the production tubular. The plurality of metal loss sensors may further include a metal loss sensor disposed integrally with the choke valve on the surface to detect metal wall loss inside the choke (e.g., at the choke point) valve as a result of sand particle impingement that may cause choke valve failure. The metal loss may be monitored by the metal loss sensors by regularly logging the resistance of each of the measuring elements. Electrical resistance of the metal pipe increases as sand impinges to erode its internal walls. The change in electrical resistance rises proportionately to the quantity of metal loss. The detected metal loss measurements from each of the plurality of metal loss sensors may be represented as a metal loss count or value that can be compared against a predefined metal loss limit that represents a threshold limit of metal loss or erosion for preemptively shutting down the well to prevent uncontrolled equipment failure or catastrophic leaks that damage the well or the environment. The metal loss sensors may be operable to detect the respective metal loss measurement data in real-time and transmit that data to the controller along with identification information identifying the specific metal loss sensor generating and transmitting the data, and/or the specific/precise location of the transmitting sensor. Such identification information may be used by the controller to pinpoint the location of the "problem area" or "problem component" along the fluid flow path to the SCADA system.

The controller at block 1005 may further obtain sensor data from pressure sensors to detect pressure values along the flow path such as, flowing bottomhole pressure, flowing wellhead pressure, flowing or closed reservoir pressure, and the like. The pressure sensors may include a downhole pressure sensor disposed downhole adjacent to a bottomhole end of the wellbore, a surface pressure sensor disposed along a flowline adjacent (e.g., upstream from) the choke valve, flow meters, and the like. At block 1005 the controller may obtain the measurement data from the plurality of sensors via a data acquisition module (e.g., module 260, 325 in FIGS. 2-3).

Method 1000 then proceeds to block 1010 where the controller determines current maximum sand erosional velocity ratio based on the sensor data obtained at block 1005. For example, the controller may utilize the erosional velocity equation of the Salama model and the physics correlation software described in connection with FIGS. 4-9 to determine the maximum sand erosional velocity ratio based on the measured sensor data. The controller at block 1010 may further be configured to determine a current pressure drawdown (e.g., pressure differential, current production flow rate, fluid flow rate, production rate, and the like) based on the obtained sensor data from the pressure sensors.

At block 1015, the controller transmits the obtained sensor data, the determined maximum sand erosional velocity ratio and the pressure drawdown data, and the predetermined data (including threshold limit data) stored in memory to SCADA system (e.g., SCADA system 270, 360 in FIGS. 2-3) for presenting the (real-time) measured sensor data to an operator along with corresponding approaching threshold limits. For example, the threshold data may include data indicating a permissible maximum sand erosional velocity ratio limit representing a maximum permissible rate at which surfaces along the fluid flow path can erode or abrade with contact by the flowing sand. In addition, the predefined threshold data may include a pressure drawdown operating window (e.g., pressure drawdown limit) indicating an optimum fluid flow rate range that meets predetermined rate commitments (e.g., optimum production flow rate range). Still further, the predefined threshold data may include predefined metal thickness loss limit data indicating a threshold limit of metal loss or erosion, which any of the metal loss sensors detect across the production tubular, surface choke valve, and the like, for preemptively shutting down the well to prevent uncontrolled equipment failure or catastrophic leaks that damage the well or the environment. SCADA system may allow operators at locations remote to the wellsite to review the (live, real-time) sensed measurement data and automated operations being performed by the sand controlling and monitoring system based on the detected sensor data. By enabling remote control and monitoring of the wellsite via the SCADA system, unnecessary presence or visits of operation personnel to remote, hard to reach wellsites can be avoided, thereby increasing efficiency and reducing costs.

Method 1000 at block 1015 may also enable the operator to be notified (e.g., by issuing an alarm) of approaching threshold limits. For example, based on the real-time metal loss sensor data and the corresponding predefined metal loss limit data presented on the SCADA system, the operator can determine whether an automatic shutdown of the well by the controller via the ESD and SSV is forthcoming or imminent. The operator may also identify events of high sand production rates (e.g., sand grain attack) based on the current maximum sand erosional velocity ratio determined by the controller approaching or exceeding the predefined maximum sand erosional velocity ratio limit. The system thus provides an integrated solution for preventing tubular and choke valve failures while maintaining production requirements and keeping sand production rates below permissible erosion limits. The system thus results in saving operating expenses from avoidable repairs/replacements, minimizing loss of production, enhancing safety and saving oil/gas industry environments.

After obtaining the current maximum sand erosional velocity ratio, the controller may, at block 1020, determine whether the obtained current maximum sand erosional velocity ratio is within a predefined maximum sand erosional velocity ratio limit (e.g., limit value=1). If the controller determines the current maximum sand erosional velocity ratio across the flow path to be within the maximum permissible sand erosional velocity ratio limit (YES at block 1020; See, e.g., FIG. 6, within operating envelope), the controller determines that no choke valve adjustment is needed and that the fluid flow with the acceptable current sand production rate may continue to flow through the choke valve to flow lines further downstream for further processing, thereby maintaining production within the pressure drawdown operating window and meeting production rate commitments. If the controller determines the current maximum sand erosional velocity ratio across the flow path to be within the maximum permissible sand erosional velocity ratio limit (YES at block 1020), operation proceeds to block 1035.

However, if the controller determines the current maximum sand erosional velocity ratio is not within the maximum permissible sand erosional velocity ratio limit (NO at block 1020; See, e.g., FIG. 9, sand-rate outside of operating envelope), operation proceeds to block 1025 where the controller may determine the optimum choke valve setting based on the predefined correlation between the sand production rate, the pressure drawdown, and the maximum sand erosional velocity ratio, such that the maximum sand erosional velocity ratio becomes within the maximum permissible sand erosional velocity ratio limit, and the pressure drawdown (or corresponding flow rate) remains within the predetermined drawdown operating window or limit. More specifically, at block 1025, based on the predefined correlation between the sand production rate, the pressure drawdown, and the maximum sand erosional velocity ratio, and based on the current sand production rate and the current flow rate (or pressure drawdown), the controller may determine or identify a new pressure drawdown (new flow rate; within the pressure drawdown operating window or limit) whose corresponding maximum sand erosional velocity ratio will be within the permissible maximum sand erosional velocity ratio limit.

Finally, at block 1025, the controller may determine the optimum choke valve setting that will produce the new determined pressure drawdown or flow rate. That is, the position of the choke valve that will produce the new determined pressure drawdown may be known based on a correlation between choke positions and pressure drawdown or production fluid flow rate. And once the new pressure drawdown value is determined, the controller may identify the corresponding choke position that can produce the new pressure drawdown. For example, the controller may determine a new stroke position of the choke valve (e.g., choke valve 220, 345 in FIGS. 2-3) based on the determined new pressure drawdown (e.g., set choke opening position from $30/64^{th}$ of an inch to $28/64^{th}$ of an inch based on the new pressure drawdown when the choke valve is adjustable in increments (strokes) of $1/64^{th}$ of an inch). Next, at block 1030, the controller may control choke valve actuator (e.g., choke valve mover 340 in FIG. 3) by transmitting a control signal to the actuator to automatically adjust the choke position of the choke valve so that the production flow (pressure drawdown) can be adjusted based on the optimum choke valve setting determined at block 1025.

At block 1035, the controller determines whether an ESD condition has been detected based on the sensor data obtained at block 1005 and based on data regarding a predefined metal loss limit. As explained previously, the controller at block 1005 may obtain sensor data from each of a plurality of metal loss sensors that are dispersed along the fluid flow path of the well at locations downhole inside the wellbore as well as at locations uphole, on the surface (e.g., metal loss sensors 210 disposed along tubular 170 and inside choke valve 220 in FIG. 2). At block 1035, the controller may compare the metal thickness loss measurement data obtained from each of the plurality of metal loss sensors against predefined metal loss limit data that represents a threshold limit of metal loss or erosion for preemptively shutting down the well to prevent uncontrolled equipment failure or catastrophic leaks that damage the well or the environment. The controller at block 1035 may detect the ESD condition when the controller determines that the threshold loss limit has been reached for any of the plurality of metal loss sensors of the well system. In some embodiments, the threshold loss limit may be individually set for each of the plurality of metal loss sensors. For example, the metal loss measurement data from the metal loss sensor inside the choke valve may be compared to a first threshold, while the metal loss measurement data from the metal loss sensor disposed downhole along the production tubular compared to a second threshold. The controller may be configured to detect the ESD condition when it is determined that the metal loss threshold for one (or more) of the sensors has been reached. Alternately, the controller may be configured to detect the ESD condition when it is determined that the metal loss threshold for a predetermined number of sensors from among the plurality of sensors has been reached. A positive detection of the ESD condition at block 1035 based on the threshold limit being reached for a particular one of the metal loss sensors may depend on the location of the particular metal loss sensor. For example, the metal loss sensor inside the choke valve (or at a joint or another valve along the flow path) may singlehandedly trigger the ESD condition at block 1035. However, metal loss sensors distributed across the production tubular may trigger the ESD condition only when a predetermined number of the sensors along the tubular have reached the threshold metal loss limit.

When the controller at block 1035 determines that the ESD condition has been detected (YES at block 10040), operation proceeds to block 1045 where the controller controls ESD (e.g., ESD 255, 350 in FIGS. 2-3) by transmitting a control signal to the ESD to automatically shut down the well by closing the SSV (e.g., SSV 224, 355 in FIGS. 2-3), thereby preventing leaks, catastrophic failures, and/or damage to the well and/or the environment. If, on the other hand, the controller at block 10035 determines that the ESD condition has not been detected (NO at block 1040), operation proceeds to block 1005 again and the steps of method 1000 are performed again.

The integrated sand monitoring and controlling system and method provides several advantages. First, the system monitors and controls well production (e.g., flow rate) for operating sand prone oil/gas wells within an allowable integrity envelope (e.g., within maximum sand erosional velocity ratio limit, within pressure drawdown operating window; FIGS. 6 and 9). Second, the system can adjust the well production rate (e.g., flow rate, pressure drawdown) in response to the sand production rate while under predetermined operating conditions (e.g., pressure drawdown operating window, sand erosional velocity ratio limit, within integrity envelope) as long as the metal loss from sand erosion is within the acceptable metal loss limit. Third, the system offers a supervisory system that eliminates labor-intensive physical presence at the wellsite to shut down the well and/or conduct maintenance or to replace a malfunctioning choke valve. Fourth, the system enables an operator to make any necessary choke replacement by utilizing the advisory SCADA system indicating approaching metal loss limits. Fifth, the system provides notifications to engineers with respect to the downhole tubing integrity to perform any necessary tubing replacement utilizing workover rigs. Sixth, the system ensure safety of well tubular, surface choke valves and flow lines by monitoring sand production rate and metal loss counts during a well's production lifecycle. Seventh, the system adaptively adjusts the choke in response to the sand production rate, and promptly shuts down the well when a metal loss count reaches a predefined metal thickness loss limit. Eighth, the system eliminates the need for deferring normal production to measure the sand rate by utilizing permanent downhole sand meters. Ninth, the system allows sand production rate monitoring when higher oil production rates are required to meet production commitments, and keep ad hoc production disruptions to a minimum.

FIG. 11 is a functional block diagram of an exemplary computer system 1100 in accordance with one or more embodiments. In some embodiments, system 1100 is a programmable logic controller (PLC). System 1100 may include memory 1104, processor 1106, and input/output (I/O) interface 1108. Memory 1104 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random-access memory (SRAM), synchronous dynamic RAM (SDRAM)), or bulk storage memory (e.g., CD-ROM or DVD-ROM, hard drives). Memory 1104 may include a non-transitory computer-readable storage medium (e.g., non-transitory program storage device) having program instructions 1110 stored thereon. Program instructions 1110 may include program modules 1112 that are executable by a computer processor (e.g., processor 1106) to cause the functional operations described, such as those described with regard to well control system 140, sand monitoring and controlling system 150, controller 250, control module 320, system 200 or 310, or method 1000.

Processor 1106 may be any suitable processor capable of executing program instructions. Processor 1106 may include a central processing unit (CPU) that carries out program instructions (e.g., the program instructions of the program modules 1112) to perform the arithmetical, logical, or input/output operations described. Processor 1106 may include one or more processors. I/O interface 1108 may provide an interface for communication with one or more I/O devices 1114, such as a joystick, a computer mouse, a keyboard, or a display screen (for example, an electronic display for displaying a graphical user interface (GUI)). I/O devices 1114 may include one or more of the user input devices. I/O devices 1114 may be connected to I/O interface 1108 by way of a wired connection (e.g., an Industrial Ethernet connection) or a wireless connection (e.g., a Wi-Fi connection). I/O interface 1108 may provide an interface for communication with one or more external devices 1116. In some embodiments, I/O interface 1108 includes one or both of an antenna and a transceiver. In some embodiments, external devices 1116 include sensors such as any of sensors 205, 210, 215, 235, 350 described in connection with system 200, 300.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

Many other embodiments will be apparent to those of skill in the art upon reviewing the above description. The scope of the subject matter of the present disclosure therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method for monitoring and controlling operations of a well, the method comprising:
    obtaining measurement data from each of a plurality of sensors, the measurement data including data of a sand production rate from a sand metering sensor, pressure data from at least one pressure sensor, and data of a metal loss value from at least one metal loss sensor;
    determining a maximum sand erosional velocity ratio and a pressure drawdown based on the obtained measurement data;
    determining whether the maximum sand erosional velocity ratio is within a predetermined maximum sand erosional velocity ratio limit;
    determining an optimum choke valve setting based on a predefined correlation between the sand production rate, the pressure drawdown, and the maximum sand erosional velocity ratio, in response to determining that the maximum sand erosional velocity ratio is not within the predetermined maximum sand erosional velocity ratio limit, wherein an updated pressure drawdown produced by the determined optimum choke valve setting is within a predetermined pressure drawdown operating window;
    setting a surface choke valve based on the determined optimum choke valve setting by transmitting a first control signal to a choke valve actuator to electronically set the choke valve automatically to the determined optimum choke valve setting;
    detecting an emergency shutdown condition in response to determining that the obtained metal loss value has reached a predefined metal loss limit value; and
    shutting down the well by triggering an emergency shutdown device (ESD) in response to detecting the emergency shutdown condition, the step of triggering the ESD comprises transmitting a second control signal to the ESD to close a surface safety valve.

2. The method according to claim 1, wherein:
    the sand metering sensor is disposed downhole adjacent a bottomhole end of a wellbore of the well,
    the at least one pressure sensor includes a downhole pressure sensor that is disposed adjacent the bottomhole end of the wellbore to measure a flowing bottomhole pressure of the well, and a surface pressure sensor that is disposed adjacent to the choke valve on the surface to measure a flowing wellhead pressure of the wellbore, and
    the at least one metal loss sensor includes a first plurality of metal loss sensors disposed along a fluid flow path defined by downhole production tubing of the wellbore, and a second metal loss sensor integrally provided in the choke valve on the surface.

3. The method according to claim 2, wherein:
    the first plurality of metal loss sensors disposed along the fluid flow path provide metal thickness loss measurement values of an inner wall of the production tubing, and
    the second metal loss sensor provides metal thickness loss measurement values of restricting or sealing elements at a choke point inside the choke valve.

4. The method according to claim 3, wherein determining the obtained metal loss value has reached the predefined metal loss limit value comprising determining at least one of:

a first metal thickness loss measurement value obtained from at least one of the first plurality of metal loss sensors has reached a first predefined metal loss limit value corresponding to the first plurality of metal loss sensors; and a second metal thickness loss measurement value obtained from the second metal loss sensor has reached a second predefined metal loss limit value corresponding to the second metal loss sensor.

5. The method according to claim 2, further comprising determining the pressure drawdown as the difference between the measured flowing bottomhole pressure and the measured flowing wellhead pressure.

6. The method according to claim 1, further comprising determining the maximum sand erosional velocity ratio based on the measured sand production rate and the determined pressure drawdown.

7. The method according to claim 1, further comprising transmitting the obtained measurement data, the determining maximum sand erosional velocity ratio and the pressure drawdown, and predetermined data to a supervisory control and data acquisition system for providing an overview of the monitoring and controlling operations of the well to an operator.

8. The method according to claim 7, wherein the predetermined data includes:
the predefined correlation between the sand production rate, the pressure drawdown, and the maximum sand erosional velocity ratio;
the maximum sand erosional velocity ratio limit;
the predetermined pressure drawdown operating window; and
the predefined metal loss limit value.

9. The method according to claim 7, further comprising notifying the operator in response to determining at least one of the maximum sand erosional velocity ratio is approaching the maximum sand erosional velocity ratio limit, and the obtained metal loss value is approaching the predefined metal loss limit value.

10. The method according to claim 1, further comprising setting the surface choke valve based on the determined optimum choke valve setting, and shutting down the well by triggering the ESD, automatically and without any user intervention.

11. A system for monitoring and controlling operations of a well, the system comprising:
a plurality of sensors for obtaining measurement data, the plurality of sensors including a sand metering sensor for obtaining data of a sand production rate, at least one pressure sensor for obtaining pressure data, and at least one metal loss sensor for obtaining data of a metal loss value;
a choke valve that is disposed on a production fluid flow path on a surface of the well, and that is adjustable to change a fluid flow;
an emergency shutdown device (ESD) that is operable to shutdown the well by closing a surface safety valve;
memory storing predetermined data including a predefined correlation between the sand production rate, pressure drawdown, and a maximum sand erosional velocity ratio;
one or more processors operatively coupled to the plurality of sensors, the choke valve, the ESD, and the memory, the one or more processors being configured to:

obtain the measurement data from each of the plurality of sensors;
determine the maximum sand erosional velocity ratio and the pressure drawdown based on the obtained measurement data;
determine whether the maximum sand erosional velocity ratio is within a predetermined maximum sand erosional velocity ratio limit;
determine an optimum choke valve setting based on the predefined correlation in response to determining that the maximum sand erosional velocity ratio is not within the predetermined maximum sand erosional velocity ratio limit, wherein an updated pressure drawdown produced by the determined optimum choke valve setting is within a predetermined pressure drawdown operating window;
set the choke valve based on the determined optimum choke valve setting;
detect an emergency shutdown condition in response to determining that the metal loss value from the at least one metal loss sensor has reached a predefined metal loss limit value; and
shut down the well by triggering the ESD in response to detecting the emergency shutdown condition; and
a supervisory control and data acquisition system for providing an overview of the monitoring and controlling operations of the well, the one or more processors are further configured to transmit the obtained measurement data, the determining maximum sand erosional velocity ratio and the pressure drawdown, and the predetermined data to the supervisory control and data acquisition system for presenting to an operator.

12. The system according to claim 11, wherein:
the sand metering sensor is disposed downhole adjacent a bottomhole end of a wellbore of the well,
the at least one pressure sensor includes a downhole pressure sensor that is disposed adjacent the bottomhole end of the wellbore to measure a flowing bottomhole pressure of the wellbore, and a surface pressure sensor that is disposed adjacent to the choke valve on the surface to measure a flowing wellhead pressure of the wellbore, and
the at least one metal loss sensor includes a first plurality of metal loss sensors disposed downhole along a production tubing of the wellbore, and a second metal loss sensor integrally provided in the choke valve.

13. The system according to claim 12, wherein:
the first plurality of metal loss sensors disposed along the production tubing provide corresponding metal thickness loss measurement values of an inner wall of the production tubing, and
the second metal loss sensor provides metal thickness loss measurement values of restricting or sealing elements at a choke point inside the choke valve.

14. The system according to claim 13, wherein the one or more processors being configured to determine the obtained metal loss value has reached the predefined metal loss limit value comprises the one or more processors being configured to determine at least one of:
a first metal thickness loss measurement value of at least one of the first plurality of metal loss sensors has reached a first predefined metal loss limit value corresponding to the first plurality of metal loss sensors; and
a second metal thickness loss measurement value of the second metal loss sensor has reached a second predefined metal loss limit value corresponding to the second metal loss sensor.

15. The system according to claim 11, wherein the one or more processors are further configured to set the surface choke valve based on the determined optimum choke valve setting, and shutdown the well by triggering the ESD, automatically and without any user intervention.

16. The system according to claim 11, further comprising:
a choke valve actuator to electronically adjust the choke valve, wherein the one or more processors are configured to transmit a first control signal to the choke valve actuator to set the choke valve to the determined optimum choke valve setting, and
wherein the one or more processors are further configured to transmit a second control signal to the ESD to close the surface safety valve of the well.

17. A non-transitory computer-readable recording medium having stored thereon a program for monitoring and controlling operations of a well—, the program comprising instructions that, when executed by one or more hardware processors, cause the one or more hardware processors to:
obtain measurement data from each of a plurality of sensors, the measurement data including data of a sand production rate from a sand metering sensor, pressure data from at least one pressure sensor, and data of a metal loss value from at least one metal loss sensor;
determine a maximum sand erosional velocity ratio and a pressure drawdown based on the obtained measurement data;
determine whether the maximum sand erosional velocity ratio is within a predetermined maximum sand erosional velocity ratio limit;
determine an optimum choke valve setting based on a predefined correlation between the sand production rate, the pressure drawdown, and the maximum sand erosional velocity ratio, in response to determining that the maximum sand erosional velocity ratio is not within the predetermined maximum sand erosional velocity ratio limit, wherein an updated pressure drawdown produced by the determined optimum choke valve setting is within a predetermined pressure drawdown operating window;
control to set a surface choke valve based on the determined optimum choke valve setting;
determine whether the obtained metal loss value has reached a predefined metal loss limit value;
control to shut down the well by triggering an emergency shutdown device (ESD) in response to determining that the obtained metal loss value has reached the predefined metal loss limit value, and
the program further comprising instructions that, when executed by one or more hardware processors, cause the one or more hardware processors to transmit the obtained measurement data, the determining maximum sand erosional velocity ratio and the pressure drawdown, and data of the predefined correlation to a supervisory control and data acquisition system for providing an overview of monitoring and controlling operations of the well.

* * * * *